(12) United States Patent
Sloan et al.

(10) Patent No.: US 7,401,040 B2
(45) Date of Patent: Jul. 15, 2008

(54) FINANCIAL MODELING AND COUNSELING SYSTEM

(75) Inventors: Ronald E. Sloan, Toronto (CA); Stephen B. Slutsky, Toronto (CA)

(73) Assignee: Accenture LLP, Chicago, IL (US)

( * ) Notice: Subject to any disclaimer, the term of this patent is extended or adjusted under 35 U.S.C. 154(b) by 1218 days.

(21) Appl. No.: 09/927,560

(22) Filed: Aug. 10, 2001

(65) Prior Publication Data

US 2002/0111890 A1  Aug. 15, 2002

Related U.S. Application Data

(63) Continuation of application No. 09/705,154, filed on Nov. 1, 2000, now abandoned, and a continuation-in-part of application No. 09/580,276, filed on May 25, 2000, now abandoned, and a continuation-in-part of application No. 09/431,389, filed on Nov. 1, 1999, now abandoned.

(51) Int. Cl.
*G06Q 40/00* (2006.01)
(52) U.S. Cl. .......................... 705/36; 705/35
(58) Field of Classification Search .............. 705/35, 705/36
See application file for complete search history.

(56) References Cited

U.S. PATENT DOCUMENTS

| | | | |
|---|---|---|---|
| 4,822,647 A | 4/1989 | Nozaki et al. | |
| 4,896,291 A | 1/1990 | Gest et al. | |
| 4,953,085 A | 8/1990 | Atkins | |

(Continued)

FOREIGN PATENT DOCUMENTS

GB    2 192 567 A    1/1998

(Continued)

OTHER PUBLICATIONS

Press Release, "ZY.COM: ZY.com makes creating and publishing websites simple and Free for everyone", M2 Presswire; Coventry; Mar. 26, 1998, pp. 2, extracted on Internet on Oct. 29, 2001 from Proquest database [http://proquest.umi.com/pqdweb].

(Continued)

*Primary Examiner*—James Kramer
*Assistant Examiner*—Jocelyn W. Greimel
(74) *Attorney, Agent, or Firm*—Oppenheimer Wolff & Donnelly LLP

(57) ABSTRACT

The present invention relates to a web-based financial management system for providing personalized financial coaching to a user. The system operates in a collaborative computing environment between the user and a financial advisor and comprises a service level subsystem and an advice generating subsystem. The service level subsystem allows the user to negotiate a service level agreement that defines the user's desired level of support and limits access to user provided information. The advice generating subsystem is coupled to the service level subsystem and includes one or more coaching engines that dynamically analyze the financial needs of the user in accordance with the user's service level agreement. Furthermore, the coaching engine provides customized financial advice tailored to the user's life intentions. The present invention also provides for a financial portfolio management subsystem enabling the user to model the effects of adding or deleting various securities and helping the user to better conform his portfolio to his level of risk tolerance and his investment style.

22 Claims, 17 Drawing Sheets

U.S. PATENT DOCUMENTS

| | | | |
|---|---|---|---|
| 5,132,899 A | 7/1992 | Fox | |
| 5,185,696 A | 2/1993 | Yoshino et al. | |
| 5,193,056 A | 3/1993 | Boes | |
| 5,214,579 A | 5/1993 | Wolfberg et al. | |
| 5,222,019 A | 6/1993 | Yoshino et al. | |
| 5,729,700 A | 3/1998 | Melnikoff | |
| 5,761,442 A | 6/1998 | Barr et al. | |
| 5,784,696 A | 7/1998 | Melnikoff | |
| 5,799,287 A | 8/1998 | Dembo | |
| 5,806,049 A | 9/1998 | Petruzzi | |
| 5,811,055 A | 9/1998 | Geiger | |
| 5,819,263 A | 10/1998 | Bromley et al. | |
| 5,826,250 A | 10/1998 | Trefler | |
| 5,852,811 A | 12/1998 | Atkins | |
| 5,870,550 A | 2/1999 | Wesinger, Jr. | |
| 5,875,437 A | 2/1999 | Atkins | |
| 5,884,287 A | 3/1999 | Edesess | |
| 5,893,079 A | 4/1999 | Cwenar | |
| 5,903,879 A | 5/1999 | Mitchell | |
| 5,911,135 A | 6/1999 | Atkins | |
| 5,918,217 A | 6/1999 | Maggioncalda et al. | |
| 5,930,774 A | 7/1999 | Chennault | |
| 5,940,812 A | 8/1999 | Tengel et al. | |
| 5,963,625 A | 10/1999 | Kawecki | |
| 5,963,925 A | 10/1999 | Kolling et al. | |
| 5,970,478 A | 10/1999 | Walker et al. | |
| 5,978,778 A | 11/1999 | O'Shaughnessy | |
| 5,987,436 A | 11/1999 | Halbrook | |
| 5,999,918 A | 12/1999 | Williams et al. | |
| 6,003,018 A | 12/1999 | Michaud et al. | |
| 6,006,201 A | 12/1999 | Berent et al. | |
| 6,012,042 A | 1/2000 | Black et al. | |
| 6,012,043 A | 1/2000 | Albright et al. | |
| 6,012,044 A | 1/2000 | Maggioncalda et al. | |
| 6,018,722 A | 1/2000 | Ray et al. | |
| 6,018,768 A | 1/2000 | Ullman et al. | |
| 6,021,397 A * | 2/2000 | Jones et al. | 705/36 R |
| 6,055,514 A * | 4/2000 | Wren | 705/36 R |
| 6,058,378 A | 5/2000 | Clark et al. | |
| 6,064,984 A | 5/2000 | Ferguson et al. | |
| 6,064,986 A | 5/2000 | Edelman | |
| 6,069,628 A | 5/2000 | Farry | |
| 6,078,904 A | 6/2000 | Rebane | |
| 6,081,768 A | 6/2000 | Hu | |
| 6,125,355 A | 9/2000 | Bekaert et al. | |
| 6,195,697 B1 | 2/2001 | Bowman-Amuah | |
| 6,230,197 B1 | 5/2001 | Beck et al. | |
| 6,233,566 B1 | 5/2001 | Levine et al. | |
| 6,253,192 B1 | 6/2001 | Corlett et al. | |
| 6,282,520 B1 | 8/2001 | Schirripa | |
| 6,292,787 B1 | 9/2001 | Scott et al. | |
| 6,292,827 B1 | 9/2001 | Raz | |
| 6,317,726 B1 | 11/2001 | O'Shaughnessy | |
| 6,324,523 B1 * | 11/2001 | Killeen et al. | 705/36 R |
| 6,327,586 B1 | 12/2001 | Kisiel | |
| 6,332,154 B2 | 12/2001 | Beck et al. | |
| 6,336,102 B1 | 1/2002 | Luskin et al. | |
| 6,349,290 B1 | 2/2002 | Horowitz et al. | |
| 6,370,508 B2 | 4/2002 | Beck et al. | |
| 6,393,412 B1 | 5/2002 | Deep | |
| 6,408,225 B1 | 6/2002 | Ortmeier et al. | |
| 6,430,542 B1 | 8/2002 | Moran | |
| 6,470,325 B1 | 10/2002 | Leemhuis | |
| 6,477,447 B1 | 11/2002 | Lin | |
| 6,513,069 B1 | 1/2003 | Abato et al. | |
| 6,539,419 B2 | 3/2003 | Beck et al. | |
| 6,567,796 B1 | 5/2003 | Yost et al. | |
| 6,574,600 B1 | 6/2003 | Fishman et al. | |
| 6,601,044 B1 | 7/2003 | Wallman | |
| 6,606,606 B2 | 8/2003 | Starr | |
| 6,615,240 B1 | 9/2003 | Sullivan | |
| 2001/0032207 A1 | 10/2001 | Harley et al. | |
| 2001/0039493 A1 | 11/2001 | Pustejovsky et al. | |
| 2002/0161928 A1 | 10/2002 | Ndili | |

FOREIGN PATENT DOCUMENTS

| | | |
|---|---|---|
| JP | 408086190 A | 4/1996 |
| JP | 410093729 A | 9/1996 |
| JP | 411110447 A | 4/1999 |
| JP | 2000163030 A | 6/2000 |
| JP | 2000355290 A | 12/2000 |
| WO | WO0137187 | 5/2001 |

OTHER PUBLICATIONS

*Dayco* Statement Regarding Related Applications.
Glenn Kennedy et al., "Web to watch CAD companies online", from CADalyst, Sep. 1, 2000.
Rob Fanjogy, "New design software connects colleagues", from Professional Builder, Mar. 1, 1999.
Ouchi et al., "Handshake telephone system to communicate with voice and force", 1997, IEEE, pp. 466-471.
Sato et al., "Measuring system for grasping", 1996, IEEE, pp. 292-297.
Karlsson et al., "A glove equipped with finger flexion sensors as command generator used in fuzzy control system", 1998, IEEE, pp. 1330-1334.
"Personal financial software", The CPA Journal, New York, Sep. 1999, vol. 69, Iss.9; p. 40, 7 pgs, Proquest, describes numbers of software packages on the market for providing automated coaching for a financial modeling.
"Sams Teach Yourself the Internet in 24 Hours," by Ned Snell, Sams Publishing, published Jun. 17, 1999, http://proquest.safaribooksonline.com/JVXSL.asp (last accessed on Jul. 21, 2005).
Office Action issued on Jul. 31, 2007 by US PTO on U.S. Appl. No. 09/929,610.
Office Action issued by EPO on Aug. 23, 2007 regarding summons to attend oral proceedings on Application No. 02765976.2-1238.

\* cited by examiner

FINANCIAL MODELING AND COUNSELING SYSTEM

RELATED APPLICATIONS

The present application is a continuation of a parent application Ser. No. 09/705,154, filed Nov. 1, 2000 now abandoned, entitled "FINANCIAL MODELING AND COUNSELING SYSTEM", of the assignee of the present invention, incorporated herein by reference.

Furthermore, the present application is a continuation-in-part of U.S. application Ser. No. 09/431,389 entitled "SYSTEM, METHOD AND ARTICLE OF MANUFACTURE FOR A FINANCIAL MANAGEMENT AND ADVICE GENERATING INFORMATION FRAMEWORK" filed Nov. 1, 1999 now abandoned, and U.S. application Ser. No. 09/580,276 entitled "SYSTEM, METHOD AND ARTICLE OF MANUFACTURE FOR GAUGING PAST, PRESENT AND FUTURE PORTFOLIO PERFORMANCE IN A NETWORK BASED PERSONAL INVESTMENT MANAGER" filed May 25, 2000 now abandoned both of which we incorporated herein by reference.

FIELD OF THE INVENTION

The present invention relates generally to computerized information systems and more particularly to web enabled computer implemented financial modeling systems.

BACKGROUND OF THE INVENTION

Financially prudent individuals develop financial plans that help them achieve their financial goals. Traditionally, many of these individuals have entrusted their financial plans to personal financial advisors.

More recently, however, some individuals have increasingly relied upon computer-based systems that organize their financial assets and liabilities and further provide them with a summary of their financial health. However, these systems tend to focus on the administrative aspects of financial planning without enabling the user to make reasoned choices about their financial futures. Furthermore, these systems are limited by their inability to dynamically analyze the financial goals. These limitations are counterproductive to the user's needs to develop and manage an integrated personal financial plan from an executive decision-making perspective.

Many existing financial management systems allow users to electronically organize their financial assets and liabilities. These systems typically focus on presenting the user with a summary of their financial transactions over a given period of time and their financial health, at a given instance. Furthermore, these systems typically rely on the user to continually update their personal financial data, although some systems allow access to user specific online data. As a result, these systems are merely data-driven calculators that are incapable of providing the user with meaningful financial coaching tailored to their financial intentions and expectations.

Similarly, some financial management systems present a static view of the user's financial health. These systems typically require the user to provide the most current financial data relating to their financial assets and liabilities. Consequently, when the user wishes to develop or update his or her financial plan, the user must input their most recent financial information. This problem is further exacerbated by the fact that these systems demand a lot of typing and guessing when the user enters financial data. This process is time-consuming and inefficient and does not promote an intuitive understanding of how complex financial variables interact to produce a sensible financial plan.

Another problem with many existing financial management systems is that the user is typically limited to managing the transactional details of their financial data. In these systems the user is shielded from the planning and deciding aspects of developing their financial plan. Accordingly, the user learns very little from the process and remains heavily dependent on the system to provide an accurate summary of their financial health. These limitations further exacerbate the potential lack of trust inherent within the relationship between the user and the financial management system.

Furthermore, many existing financial management systems merely project a future value of the user's financial portfolio without providing an indication of the likelihood of achieving that value. Thus, the user is left without any real sense of how to compare one financial plan to another. Consequently, these systems fail to foster a deeper understanding of the risks and/or rewards associated with reasoned financial planning. Furthermore, the user is left to his own devices to interpret the projected results of his financial model and thus leaves him dependent on a live advisor to guide him on how to resolve various financial issues.

On the other end, when users consult a financial advisor a major portion of their consultation time is spent on walking a user through setting up a financial plan. Only after the financial plan is set up and analyzed by the financial advisor, can the focus shift to possible problem areas. This process is time consuming, inefficient and very expensive. The same would apply to financial advisors helping customers with setting up an ideal portfolio, consistent with the customer's risk tolerance, investment style and market attitude. Again a great deal of the valuable and expensive advisor time is spent setting up a financial profile for the customer, whereas he should be focusing on specific recommendations to achieve specific user goals.

Currently, no web-enabled system exists that dynamically incorporates all of the user's financial assets and liabilities into an integrated summary of their health. Individuals do not want to focus on the transactional details of their financial information. Instead, individuals desire to assume an executive decision-making role in managing their financial life. A financial management system is needed where the user is provided with an integrated summary of their financial health and is given personalized financial coaching tailored to their financial goals and intentions. Furthermore, since automated coaching cannot completely replace a live advisor's expertise, experience and innovation in devising specific solutions to the user's problems, access to both automated and live coaching is desirable. However, live advising may be an expensive option due to the under-use of enabling technologies and the relative unavailability of economies of scale. Thus the use of a live advisor may only be feasible for individuals with high net worth and large portfolios. Furthermore, a live advisor is not available twenty four hours a day. No existing web-based system has combined the cost savings of an automated coaching with the expertise of a live advisor, promoting an inexpensive comprehensive financial modeling and counseling tool.

SUMMARY OF THE INVENTION

The present invention combines automated coaching with live advising within the framework of an online, web-enabled financial counseling and modeling system. This allows a user to get the benefits of a live advisor's expertise, and experience and as well as the convenience and cost savings of an automated coach. An automated coach alerts and focuses the user's attention to the issues to be addressed, and frames decisions to be made. A live advisor supplies specific, innovative solutions based on the user's unique financial situation. Automated coaching helps focus the user's attention on specific problems and the live advisor provides specific solutions to those problems. This makes a more efficient use of the time spent with the live advisor.

In general terms, the present invention relates to a financial management system for providing personalized financial advice to a user. The system operates in a collaborative web-based computing environment between the user and a financial advisor and comprises a service level subsystem and an coaching subsystem. The service level subsystem allows the user to negotiate a service level agreement that defines the user's desired level of support and limits access to user provided information. The advice generating subsystem is coupled to the service level subsystem and includes one or more coaching engines that dynamically analyze the financial needs of the user in accordance with the user's service level agreement. Furthermore, the coaching engine provides customized financial analysis tailored to the user's life intentions.

The present invention also provides for a computing system that integrates the components of a user's financial life into a more comprehensive model. The system comprises an intentions profile subsystem and an aggregated modeling subsystem. The intentions profile subsystem captures the user's intentions in a dynamic and interactive computing environment. The aggregated modeling subsystem combines data from the intentions profile subsystem and external market data to create a realistic life model of the user's lifetime financial health.

In an embodiment of the present invention, the quantity and kinds of services received by the user from the system is in part based on the service level agreement. The user and the financial institution negotiate a service level suitable for the user and profitable for the financial institution. The access to the type and quantity of data provided by the user is also limited by the service level agreement. Preferably, the user interacts with the system through a user specific web page environment, wherein the web page is customized to the user based on his financial model and the data provided.

In another embodiment of the present invention, the user's life intentions regarding future income and expenses, assets and liabilities may be captured in the LifePath Model. The model integrates and displays the user's intentions as lifetime cash flow requirements. LifePath cash flow model highlights potential problems in the future and helps focus the user and advisor's attention directly to these areas in need of attention. Furthermore, the LifePath model may include a risk modeling module that allows the user to introduce random life risk events into the LifePath model in order to stress test his financial stability. The risk modeling system can combine actuarial data along with the user's interactions to foster an intuitive understanding of the user's exposure to financial risk.

In another embodiment of the present invention, a financial model generator models the user's investment portfolio from the user's inputs. Preferably, the user information includes the data supplied by to the LifePath model. The portfolio model may suggest various security options consistent with the user's investment style and risk tolerance calculating the effects of swapping various securities in and out of the user portfolio. Automated computer coaching focus the investors attention to areas in need of possible attention. This leverages the live advisor's time, who can then spent his time with the investor to immediately focus on the problem and make necessary recommendations more cost effectively.

In all modeling systems of the present invention, the user is supported by an automated rule-based coaching system directing the user's attention to the possible financial problems and suggesting areas to focus attention on. Furthermore, the user further has access to a live advisor for more specific financial advice. The access to the automated coaching and the live advisor is controlled in part by the service level agreement.

By providing both an automated coaching engine and access to a live advisor, the user can take advantage of the cost savings and convenience of an automated system as well as the full benefits of the expertise of a live financial advisor. By focusing the user's attention to specific problems areas, the user may take full advantage of his time with a live advisor by directly attacking the problem and spend unnecessary time identifying his problem and modeling his financial goals. All the information the live advisor needs has been formatted in a useful manner by the financial counseling and modeling system with the help of the automated coaching engine. These and other advantages of the present invention will be apparent upon a study of the following descriptions and drawings.

BRIEF DESCRIPTION OF THE DRAWINGS

The foregoing and other aspects and advantages are better understood from the following detailed description of a preferred embodiment of the invention with reference to the drawings, in which.

DETAILED DESCRIPTION OF THE PREFERRED EMBODIMENTS

Figure 1:
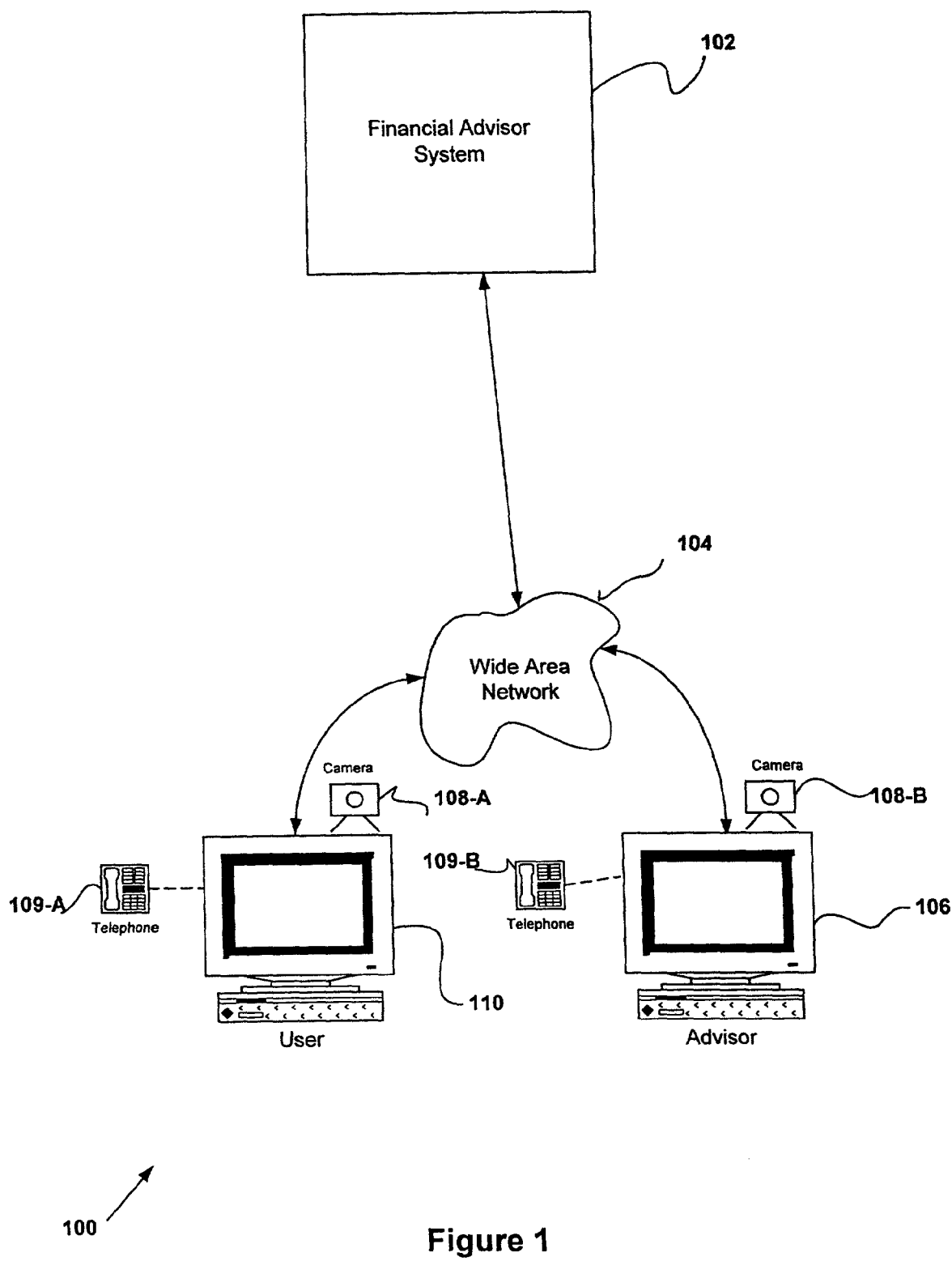
FIG. 1 illustrates a representative system architecture in accordance with a preferred embodiment.

FIG. 1 is an illustration of one embodiment of a financial management information system, in accordance with the present invention, for providing personalized financial coaching in a collaborative computing environment. In FIG. 1, financial management system 100 includes a financial advisor system 102 connected through a wide area network 104 to the live advisor terminal 106 a user terminal 110. The wide area network 104 of the present invention is the Internet. The Internet is based on the TCP/IP communication protocol first developed by the Department of Defense in the 1960s.

Preferably, the financial advisor system 102 communicates with the user through any number of devices such as handheld wireless personal organizers, pagers, cellular telephones, land telephones and regular desktop computers. All of the above equipment can act as a user terminal 110.

The user (e.g. individuals or company representative seeking financial advice) may access the system using a user terminal 110 (e.g. personal computer). A typical user computer terminal would be described in more detail in FIG. 3. The user computer is preferably equipped with software to receive live streaming video and/or still pictures over the wide area network 104, from the advisor video camera 108-B. Preferably, the user terminal 110 is further equipped with a video camera 108-A and software to transmit live streaming video from the user, across the network 104 to the live advisor at the advisor terminal 106. Access to the live financial advisor 106 and all other services provided by the Financial management system is controlled and channeled through the Financial Advisor system 102. The user can access the financial advisor system 102 through the network 104 or by telephone 109-A. A user telephone call is channeled through a call center discussed further subsequently in FIG. 2 to the Financial Advisor System and to the live advisor 106.

The live advisor terminal 106 is preferably equipped with the video camera 108-B for transmitting live streaming video. The live advisor 106 may further communicate with the user via a telephone 109-B.

Figure 2:
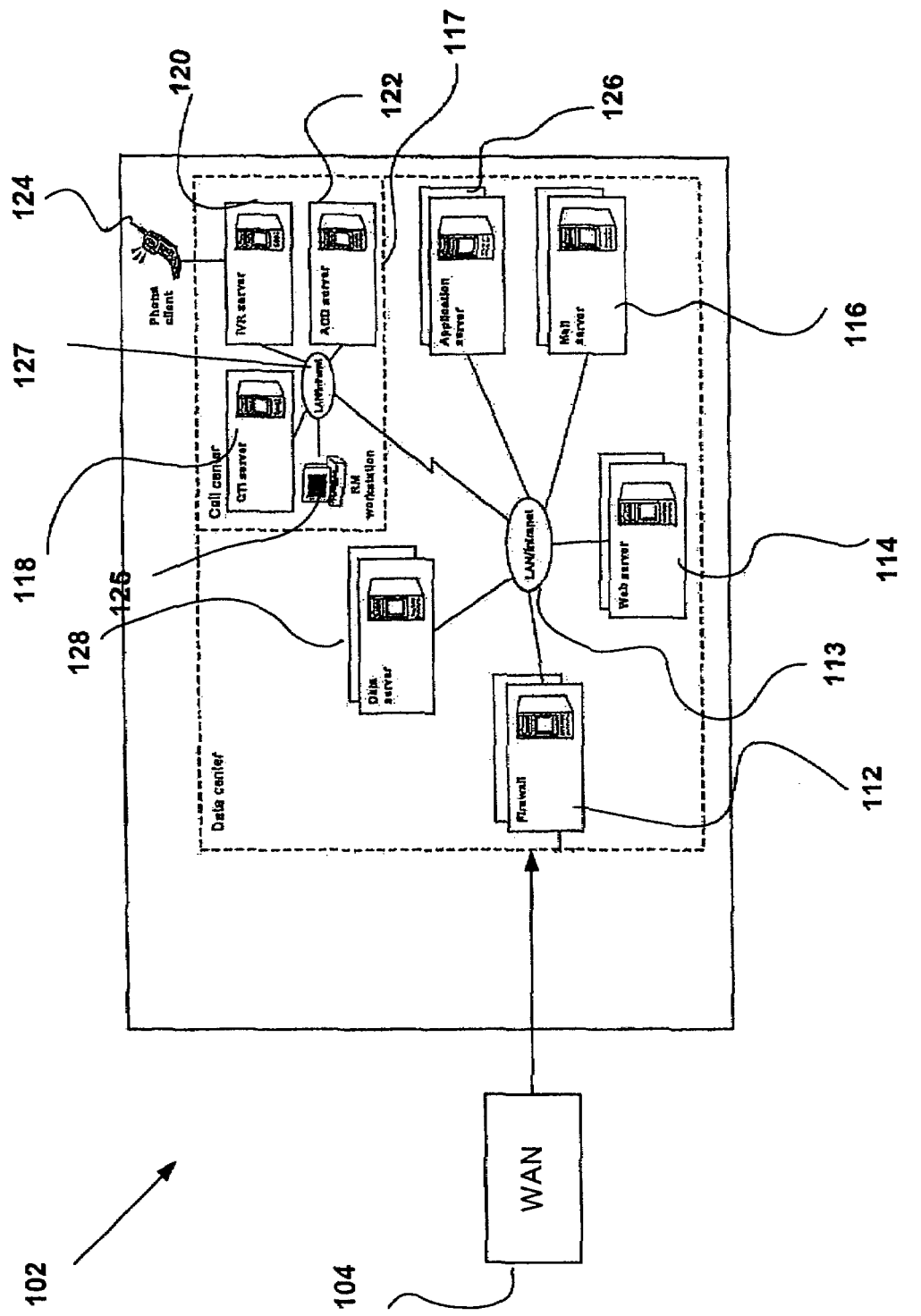
FIG. 2 is a block diagram of a financial management system.

FIG. 2 is a block diagram of an implementation of the financial advisor system 102. The user may access the system through the wide area network 104 and through a firewall server 112. In a preferable implementation of the present invention, the wide area network is the Internet, an intranet, etc. A Web server 114 provides the user with a personalized website providing an interactive interface between the user, the financial advisor and financial management system 100. The financial advisor system 102 further comprises a mail server 116, an application server 126, a call center 117 and a data server 128, all interconnected through a local area network 113. The local area network (LAN) 113 may be any wide area intranet system or the internet.

Security is important in any financial system. The firewall server 112 controls the access to the financial advisor system. The purpose and functionality of a firewall server is to prevent access to the system by unauthorized users and it would be appreciated by one skilled in the arts. Firewall servers are available through a variety of vendors and have become a standard feature of any secure system used as the primary defense against intruders and hackers.

The web server 114 provides a personalized interactive web page environment for the user to operate in once he accesses the system. The web page is acting as the web interface between the financial system Web pages may be created using the Hyper Text Markup Language (HTML), scripting languages such as Java Script™ or Pearl™ as well as Java™ applets, Visual Basic, Shock wave, Cold Fusion, etc. Creation of customized web page using any of the above programming languages is well within the scope of one skilled in the arts. The personalized web page provides an environment and an interface for the user to interact with the financial advisor system 102. As an example, in one embodiment of the present invention, by selecting an appropriate icon from the interactive personalized website, the user is able to learn, plan, decide, transact and monitor his financial model.

The mail server 116 handles electronic mail communication between the user and the financial advisor system 102. The Mail server 116 may operate using any standard protocol such as Simple Mail Transfer Protocol (SMTP) and it is within the scope of the knowledge of one skilled in the art.

The application server 126 is where the various modules of the financial advising system reside. The modules include the various coaching engines, the LifePath and the portfolio modeling sub-systems. The applications may be implemented in many programming languages, including the object oriented programming languages such as C++ or Java™ and may be based on any platform such as UNIX™, Apple OS™ or Windows™ and NT™. Furthermore, the coaching engine rules for various coaching engine can reside on a data server 180.

Alternatively, the user may also interact with financial advisor system 102 through a telephone 124. The user's call is channeled through the call center system 117. The call center 117 includes an Automatic Call Distribution (ACD) server 122, an Interactive Voice Response Server (IVR) 124, a Computer Telephony Integration (CTI) server 118 and a RM workstation 125, all interconnected through a Local Area Network or intranet 127. The local area network 113 may also be used in interconnecting the various servers of call center. When the user calls into the financial advising system 102 using a remote telephone 124, the IVR sever 124 receives the user's telephone call. The IVR system greets callers, prompting them for identification, and providing some information automatically. The Automatic Call Distributor (ACD) server 122 distributes the call using the Internet Protocol (IP) over the network, to the appropriate live coach. The Computer Telephony integration server (CTI) 118 acts as the link between the live advisor's telephone call and the workstation based applications and allows them to automatically work together. As an example, when the IVR server 120 obtains some information about the calling user, this information is delivered to the live advisor's workstation 106, so the advisor does not have to request the same information again. Once the telephone call is properly routed to the live advisor, the user can use other means of communication such as electronic mail or White Board™ simultaneously while he is interacting with the live advisor.

The Data server 128 stores user input data and supplies the application Server 126. The data server 128 includes outside database sources from which the financial advising system 102 can draw information such as actuarial data such as historical price data on securities from sources such as Reuters, user financial information such as banking and portfolio information in other financial institutions, and market information such as the day's closing numbers for various market indices as well as individual stock securities pricing information. Formatted in the Open File Exchange (OFX) format, now the accepted Internet standard used by programs such as Quicken™ and MS Money™ the data server through the firewall can easily exchange information with the outside world and specifically the user.

It should be noted that various computing platforms could be used to access the financial management system of the present invention. For example, a networked personal computer environment, a client-server system, a mainframe terminal environment, WEB TV terminal environment, dumb terminal environments can be used to access the financial management system of the present invention. Depending upon the user's needs, a client-server system (the web servers) may be the most preferable computing system for implementing the financial system of the present invention. Furthermore, the representation of each server such as an application server or a data server, is a logical representation. The actual physical systems may be distributed over many servers, or be included on a single machine.

Figure 3:
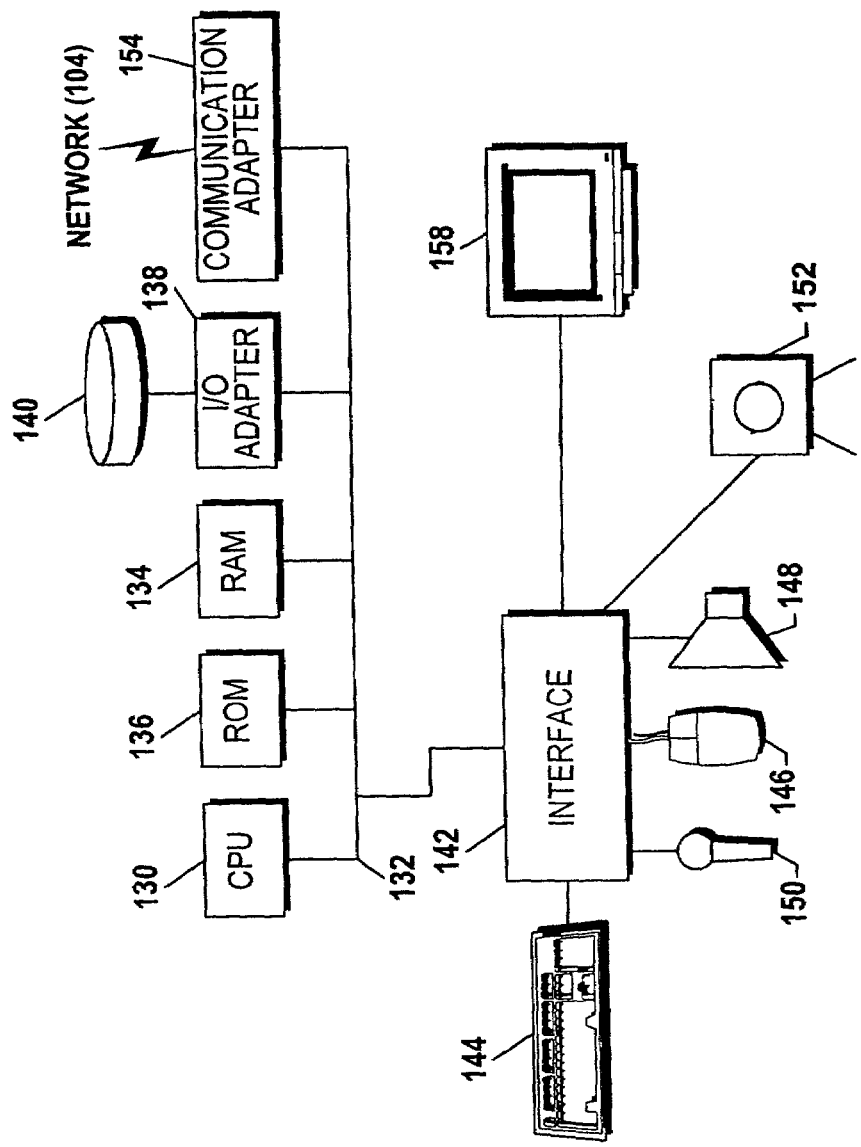
FIG. 3 is a block diagram of a representative hardware environment in accordance with a preferred embodiment.

FIG. 3 is a computer system architecture that can be used in implementing the present invention. This computer system architecture can be used to implement a user workstation, or any of the servers called for in FIG. 2. The present invention may be practiced on any of the personal computer platforms available in the market such as an IBM™ compatible personal computer, an Apple Macintosh™ computer, Solaris™ or UNIX™ based workstation. The operating system environment necessary to practice the present invention can be based on Windows™, NT™, UNIX™, Apple Operating System™, or open source operating system software such as Linux™ and Apache™. Furthermore, the computer system can support a number of processes. As appreciated by one skilled in the art, the processes may be written in any of the available programming languages including object oriented programming languages such as Java™ or C++.

The computer system architecture depicted in FIG. 3 includes of a central processing unit 130, such as a microprocessor, a read only memory (ROM) 136, a random access memory (RAM) 134, an input and output adapter 138, a storage device 140, and interface 142 connecting a plurality of input and output device such as a keyboard 144, a mouse 146, a speaker 148, a microphone 150, a video camera 152 and a display 158, and a system bus interconnecting all the components together. The computer may also include such devices as a touch screen (not shown) connected to the bus 132 and communication adapter 154 such as a dial up modem, a Digital Subscriber Line (DSL) modem or a cable modem, for connecting the workstation to a communication network 104 (e.g., the Internet). The storage device 140 can be any number of devices including but not limited to a hard diskdrive, a floppy diskdrive, a CD-ROM device, a DVD device, a tape device, and removable magnetic storage devices such as a Jazz™ drive or ZIP™ drive. There are therefore a number of computer readable media encompassed by the system depicted in FIG. 3, including but not limited to RAM 134, ROM 136, storage device 140, and storage accessible over the network connection 104.

Figure 4:
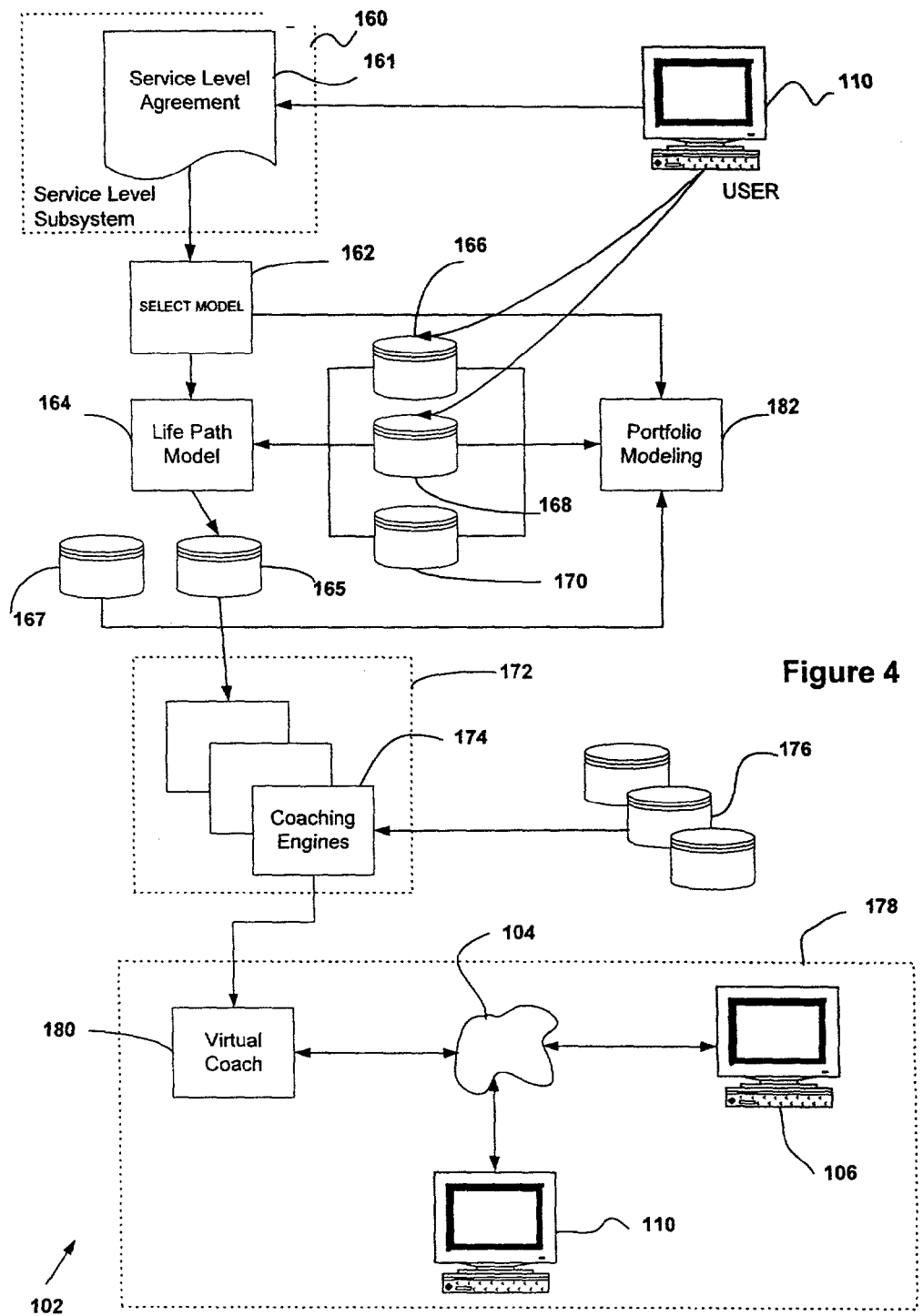
FIG. 4 is a block diagram of a financial management system.

FIG. 4 represents an illustration of the data flow of a financial advisor system 102 of the present invention. A user using for example the user computer 110, preferably connects to the financial advisor system 102 over the wide area network 104. After authentication by a firewall server, the user at a user terminal 110 enters the financial advisor system 102 at the service level subsystem 160. The service level agreement provides the level of services to which the user is entitled. Once the user has negotiated a service level agreement 161, he is prompted to select the model to be used in operation 162. In one embodiment of the present invention, the level of service and support selected in the service level agreement 160 controls the user's access to different modeling tools.

In a preferred embodiment of the present invention the LifePath model may be the hub of the financial institution's relationship. The LifePath model provides data to all coaching engine allowing customized coaching output to be dispensed to the user based on his unique financial situation. The LifePath model combines all the pertinent financial information about a user in one coherent and comprehensive picture and models the user's life intentions into an aggregated cash flow system over a user selected period of time. Using the terminal 110 the user inputs his life intentions in terms of projected income and expenses, as well as assets and liabilities. The LifePath model 164 maintains an interactive dialog between the user and financial management system 100. The LifePath model integrates the financial information available about the user in accordance with the user's service level agreement 160 to create an aggregate forecast of cash flow over the user's lifetime. The financial information available about the user includes the user's life intentions data 166 and the user's external financial data 168. In a preferred embodiment of the present invention, the user's external financial data can include current checking account information from the user's bank or data related the user's tax deferred retirement plan. By incorporating external data 168 into the LifePath model 164, the system is capable of dynamically analyzing the financial needs of the user and providing the user with an understanding of their financial health at any point with minimal input form the user. As discussed above, personalized service level agreement 160 can optionally allow the user to limit the system's and/or advisor's access to the user's external financial data 168.

Additionally, LifePath model 164 also integrates external market data 170 into the aggregated forecast of the user's cash flow. In one embodiment of the present invention, external market data 170 includes information such as current mortgage interest rates or market inflation rates. Access to both internal and external databases is controlled by the user's service level agreement. The LifePath model 164 is further discussed in a related U.S. application entitled LifePath Counseling by the same inventors as the present invention, application Ser. No. 09/929,610, filed on the same day as the present application and incorporated herein by reference.

Alternatively, the user may by pass the LifePath model and start with a portfolio modeling tool 182. The availability of the portfolio modeling tool is based on the user's service level agreement 161. The user would supply his financial portfolio information to the financial advising system 102, either directly using the user terminal 110 or indirectly through the wide area network 104, by accessing a multiplicity of databases 166, 168 and 170, and accessing information such as his securities portfolio at a particular brokerage firm.

A financial portfolio modeling tool 182, is an interactive tool that has access to all the information available to the LifePath model 162, such as the user's life intentions data 166, the user's external financial data 168, as well as external market data 170. User insight data 167 and aggregated data from the LifePath model 165 is also available to the portfolio modeling tool. As a result the user has little to input and may start using the portfolio model 182 very quickly without the need to do a lot of tedious data input. The financial portfolio modeling also allows the user to access a computer coach and/or a live advisor based in part on the service level agreement. An alternative embodiment allows the user to use the LifePath model 164 and set his long term financial goals and then use the portfolio modeling tool 182 to adjust his investment portfolio to better achieve his long term financial goals.

The LifePath interactive financial model may capture the customer's intentions at the start of the relationship and displays them as lifetime cash flow requirements. Customer data and LifePath information combine to form a deep understanding of the customer's financial needs at each stage of life. Using dynamic, interactive multimedia, it quickly captures the customer's intentions and expectations about an ideal future. This flushes out some issues which trigger the initial discussions in the relationship. It also supports estimating the lifetime value of the customer and the appropriate levels of service. The data from this model combines with insight from product and transaction history as well as real time input from the abundance of interactive models to power rule-based coaching engines. This automated advice leverages the advisor's time so that a broad customer based can be profitably supported. Configured using sliders and other interactive controls, there is little typing to slow the process down. The controls build a linear graphic representation of a life path which models predictable life transitions over time more effectively then data-driven calculators. Sales opportunities, lifetime customer value and appropriate fee structure are now more accurately identified.

Coaching generating subsystem 172 comprises one or more advice or coaching engines 174. Coaching engine 174 dynamically analyzes the financial needs of the user in accordance with the user's service level agreement. Furthermore, the coaching engine 174 is configured to operate with coaching engine rules repository 176. Coaching engine rules repository 176 is a collection of rules-based business logic that produces clear automated advice. Coaching engine rules repository 176 generates its advice using LifePath data 165 and user insight data 167. Alternatively the investment portfolio data from the portfolio modeling tool 182 triggers the coaching engines input. In one embodiment of the invention, user insight data 167 includes transaction history, product or purchase history, as well as demographic information about the user.

In addition to providing coaching to the user, advice generating subsystem 172 may also help the user to consider product solutions. As an example, in one embodiment of the present invention, the coaching engine 174 may help the user consider and include deposit products and loan products in their financial plan. For example, the coaching engine 174 may help the user consider acquiring a certain mortgage or bridge financing. Similarly, the coaching engine 174 may also suggest to the user the need for financial products such as home improvement, line of credit, or credit card products. Coaching engine 174 can also have access to product information from various financial institutions (not shown). Accordingly, the user can request additional information about the various products recommended by the system.

The user can access their financial plan or LifePath model using user terminal 110. User terminal 110 is part of collaborative computing environment 178 and is in data communication with virtual coach 180 and the advisor terminal 106 through communications network 104. In one embodiment of the present invention, communication network 104 is the Internet.

The advice and product solutions generated by the advice generating subsystem 172 are presented to the user through virtual coach 180. Virtual coach 180 presents the product recommendation with accompanying rationale. The user may or may not wish to contact the dedicated financial advisor for additional advice or information. Because the system generates reasoned financial coaching in accordance with the user's financial needs and intentions, the financial advisor is able to operate more productively. Furthermore, the user can test different scenarios by altering the data captured by LifePath model 164. Each scenario can then be analyzed by coaching engine 174. The virtual coach 180 is further described in the related U.S. application named Automated Coaching For A Financial Modeling and Counseling System, application Ser. No. 09/976,443, by the same inventors as the present invention, filed on the same day as the present application and incorporated herein by reference. Furthermore, the LifePath model is further described in the related patent titled "A Financial Planning and Counseling System Projecting User Cash Flow", application Ser. No. 09/705,288, by the same inventors as the present invention, filed on the same day as the present invention and herein incorporated by reference.

In addition to virtual coach 180, the user can optionally interact with a dedicated financial advisor 106 through communications network 104. In an embodiment of the present invention, financial advisor 106 is located in a call center 118 on a relationship manager's workstation 125. Financial advisor 106 may interact with user 110 using various multimedia interaction tools, for example, still-shot images or video streaming. Accordingly, the user is able to buttress the coaching received from virtual coach 180 with advice from a dedicated financial advisor operating at terminal 106. In many situations, the live advisor's input may be necessary, since he brings a level of expertise and experience no automated coaching system may match. However, since the automated coaching has framed the problem for the user and the live advisor, both can immediately start analyzing alternative solutions in a focused and cost efficient fashion.

Depending on the level of service the user has negotiated with the service level agreement 161, he may have multiple modeling tools available in the financial management system. In alternative embodiments of the present invention, modeling tools for analyzing various financial instruments such as bonds, reverse mortgages, option contracts and the like may be available to the user.

Figure 5:
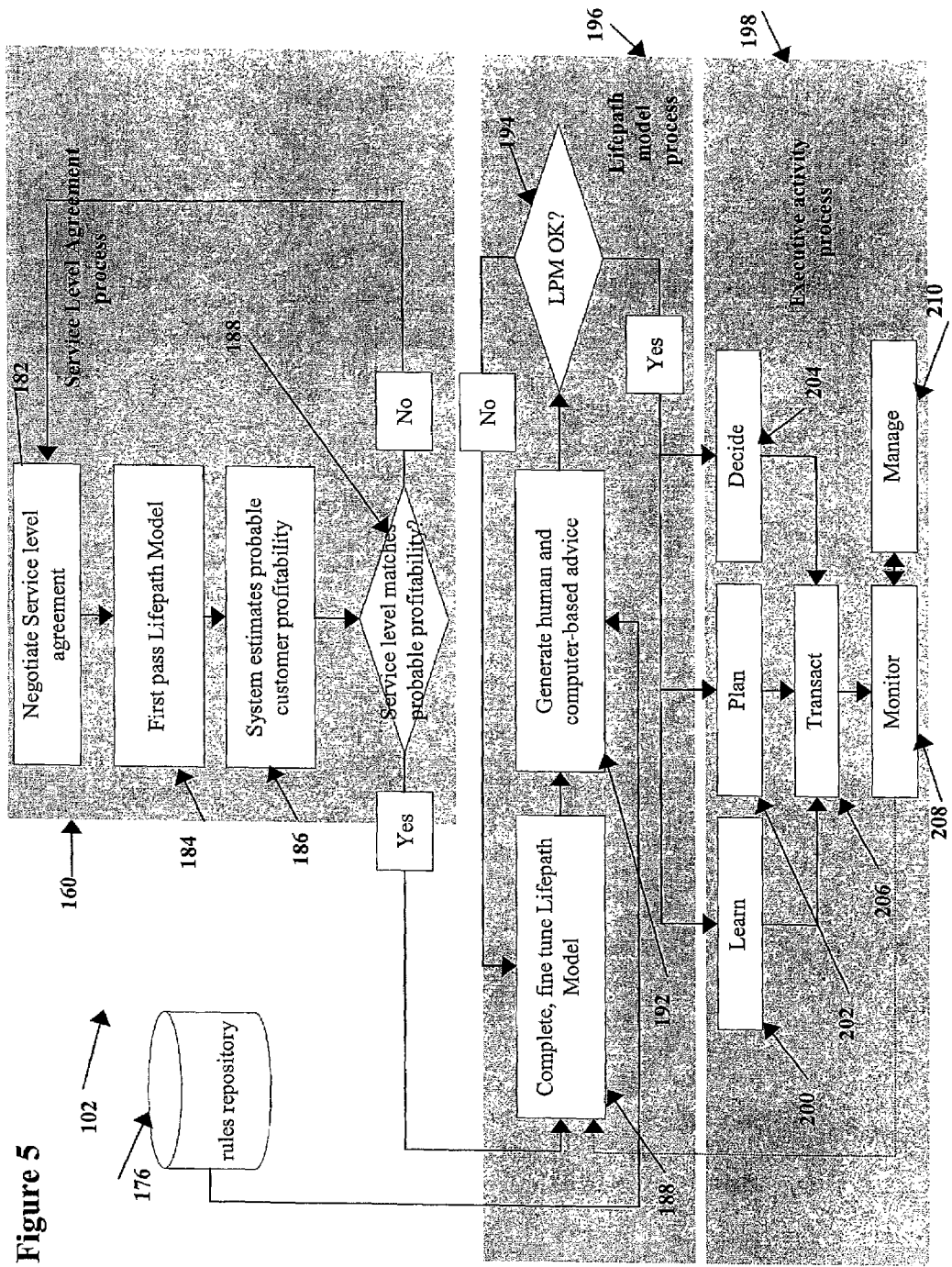
FIG. 5 is a flow diagram a financial management system.

FIG. 5 illustrates a flow diagram of an embodiment of the financial advisor system 102. The service level agreement process 160 may be one possible entry point for the user into the financial advisor system 102, where the user negotiates a service level agreement and sets the level of financial service desired. The service level level agreement 161 defines the user's desired level of advisor support as well as limiting the system's access to user provided information.

After the service level agreement 182 has been negotiated, the user makes a first pass through the LifePath model 164. Note operation 184. In one embodiment of the present invention, the user may input its life intentions in terms of revenue intentions and expense intentions and assets and liabilities such as: buying, selling or borrowing. The system then aggregates the information into a cash flow analysis over a user's income and expenses over a user defined period of time. The model may also include external data related to the user's finances. After a first pass through the LifePath model (step 184), the system may estimate the probable customer profitability 186 based on the user's financial plan given the user's life intentions and other financial information. If the user's service level agreement does not match the probable profitability 188, the user can renegotiate the service level agreement negotiation or revisit LifePath model (step 184) to modify the model parameters, and then prompt the system to re-estimate the probable user profitability 184.

After fine tuning the LifePath model (step 188), context sensitive automated computer coaching 192 is provided to the user using a coaching engine based on business logic rule-based engine. The rules repository 176 supplies business rules. The automated coaching engine 174 may highlight for the user periods within his LifePath model which need special attention, such as a projected cash deficit or cash surplus. Based on the coaching from the automated coaching engine 174 and/or a live advisor, the user may accept or reject the LifePath model (step 194). If the user rejects the LifePath model, he may further modify and fine tune the LifePath model (step 188) until he is satisfied.

In one embodiment of the present invention, the LifePath model (step 196) is followed by an executive activity process 198 where the system allows the user to assume an executive decision-making role in making their financial future. The executive activity process 198 enhances the user's ability to manage his or her financial life from an executive perspective. For example, through interaction with the system, the user learns 200, plans 202, or decides 204 the respective elements of their financial plan. Since the LifePath model 164 projects the user's cash flow in the future, the user may use the LifePath model 164 to change input variables such as savings, salary and expenses, and observe the long term effect of the changes on his financial goals. The intuitive graphical display of the LifePath model allows the user to get an immediate qualitative as well as quantitative feedback of the effects of the incremental changes on his long term goals. After engaging in these activities, the user may choose to initiate a transaction 206 based upon the advice generated by the system. In alternative embodiments of the present invention, both the automated coaching and the live advisor may recommend various financial products suitable to the user's financial situation. Furthermore, after initiating the transaction 206, the user may monitor 208 and/or manage 210 the status of the products selected. In one embodiment of the present invention, the learn icon 200 allows the user to obtain information on the products recommended by the automated coaching engine or the live advisor. The system may have to access outside databases to access third party products which may be beneficial to the user's financial situation. The rule based coaching further may check the governmental regulations and impacts of adding or deleting a specific product to the user's financial portfolio. The governmental regulations analyzed can include an analysis of the tax consequences of using a certain product specific to the user.

Figure 6:
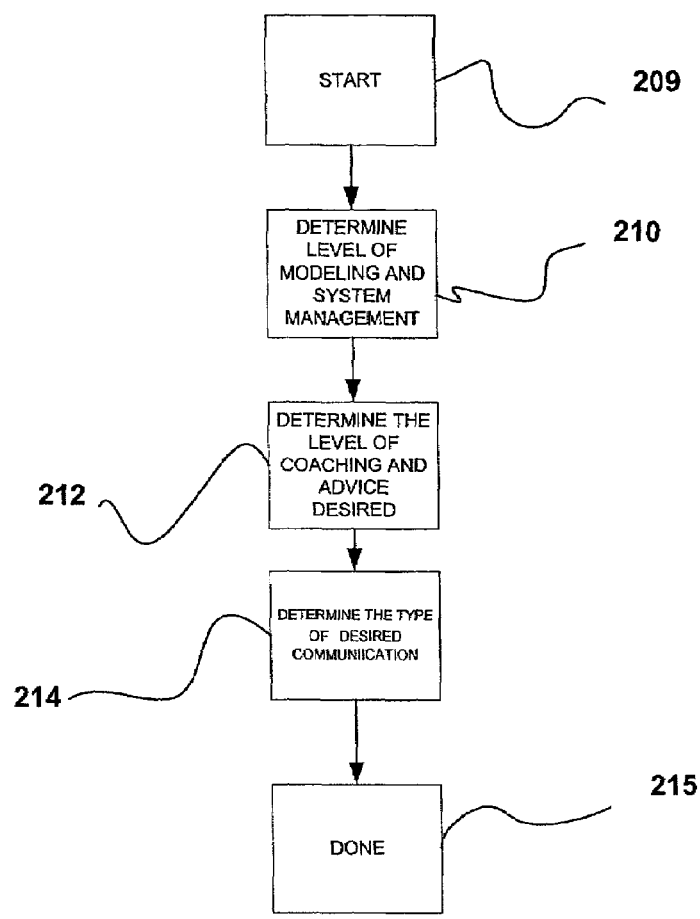
FIG. 6 is a flow diagram of a Service level agreement process.

FIG. 6 is a logical flowchart of the service level agreement process within the service level agreement negotiation 182. Preferably, financial advising takes place within the framework of a service level agreement negotiated between the customer and the financial system. The SLA nails down how much advisor time the customer wants, how information will be shared, and how much intentions-based advice the customer will welcome. Additionally the SLA may include other services such as asset tracking and reporting, administration services, tax preparation, estate planning etc. The advisor configures the web site in accordance with this agreement. The investment of effort in this, along with the personal online relationship begins to develop "stickiness". Much of the communication presented by the system is generated by rule-based business logic. This is what leverages the advisors, extending their reach. It should be noted that the client negotiates a Service Level Agreement at the start of the relationship for desired level of advisor support and how the model and/or the live advisor and the financial institution providing the service may or may not use their personal information. Web site functionality can provide new levels of customer support even if customer wants low level of advisor interaction.

When the user starts 209 the service level agreement process 160, he determines a level of system management he desires 210. This includes a determination of how much service and what kinds of service the user desires. Next, the user determines the level of coaching and advice desired 212. In one embodiment of the present invention, the user may limit himself to the use of automated coaching advice. Alternatively, the user can also limit the level and types of communication he desires 214. The service level agreement allows the customer to tailor an explicit understanding about how much and what kinds of service will be needed to meet his needs. This allows the system to match a service package to expected customer profitability, establishes the basis for service fees, and sets a service quality standard against which the system must deliver. The terms of the service level agreement include a determination of how personal information will be shared and used, how much administration will be off-loaded to the financial advice system, how much modeling and advice is desired by the user or required by the services selected, how much management of external and internal primary advisors will be needed, how day to day communications are handled, and how third party product brokerage will be managed. This list is by no means a comprehensive list and alternative embodiments of the present invention have different service level agreement terms. At the end of the service level agreement (SLA) process 215, after the user has negotiated the various options within of the service level agreement 182, he may attempt a first pass at the LifePath model 164.

Figure 7:
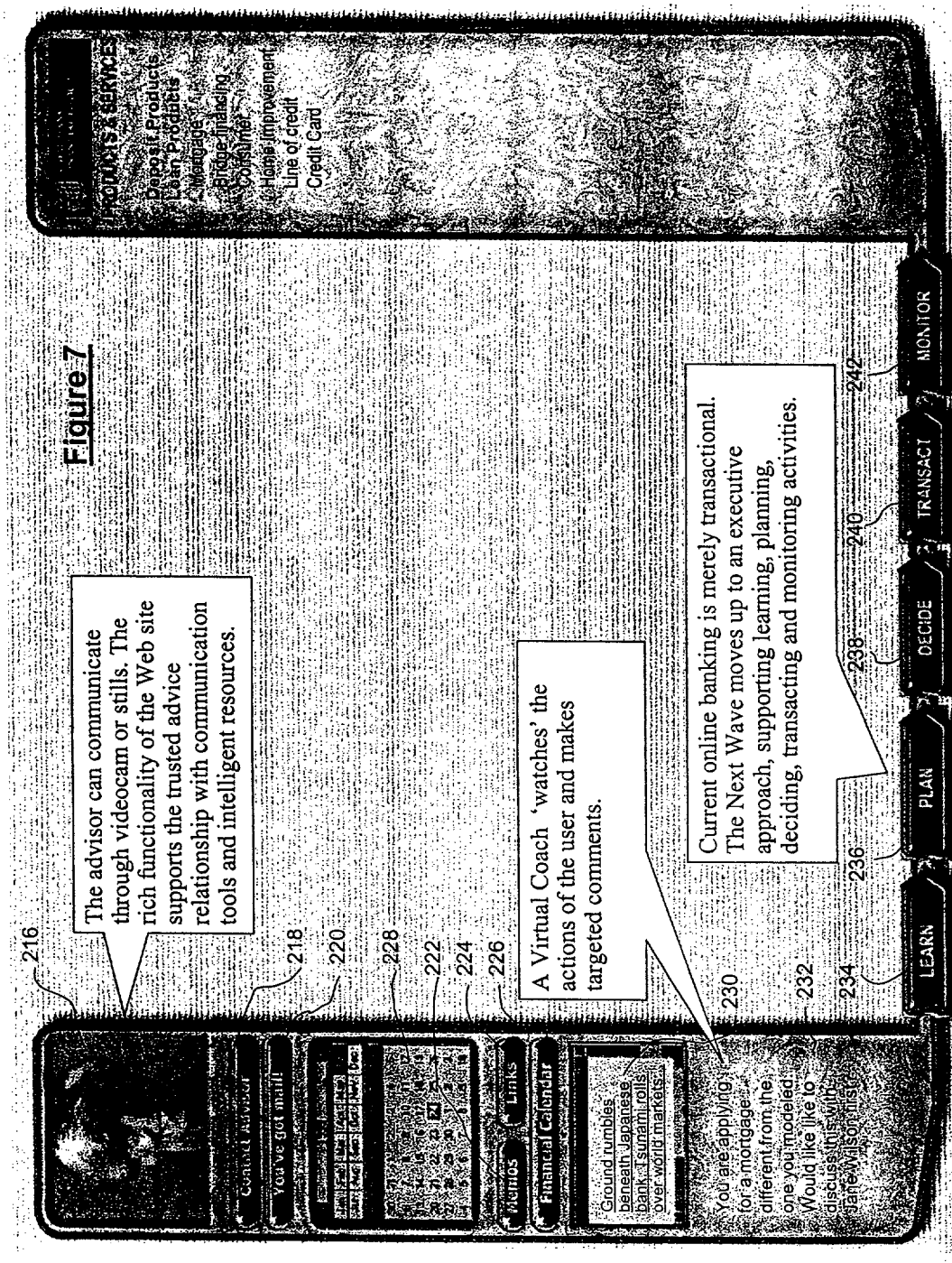
FIG. 7 is an illustration of a LifePath model web page interface.

FIG. 7 is an illustration of a LifePath model web page interface. The web page of FIG. 7 shows an embodiment of a customized web site using an intuitive user interface for the LifePath model subsystem. As previously discussed, the web site may be a personalized web site that a client uses to collaborate with a dedicated virtual (or live) financial advisor. As depicted, the graphical user interface can include an advisor area 216, where images of the live advisor may be represented as a still images, as streaming video, or represented by a character. Selecting a link, such as the Contact Advisor link 218 shown, causes a connection to the advisor to be established. Preferably, the advisor and the user are able to communicate orally via network telephony of a type known in the art, but communication via email, chat, telephone call, or of any other type is acceptable as discussed in FIG. 2.

The advisor uses the space to negotiate an initial Service Level Agreement (SLA), and begin the modeling of the customer's LifePath. This flushes out issues and permits an early estimate of customer value potential.

A link 220 may be provided that allows access to email. Other links can include a link 222 to personal memoranda, a link 224 to a links page, and a link 226 to a financial calendar. As an option, a calendar 228 and links 230 to news stories may be displayed on the page. In one embodiment of the present invention, the news can be customized by each user to fit his individual needs.

A virtual coach area 232 of the page may be provided to display the comments and advice created by the virtual coach. As described above, client data drives a rules-based "advice engine" that dynamically analyzes customer needs and automates most of advisor's work. The client may be encouraged to consolidate all their financial information in the site, recognizing assets and liabilities with other financial institutions. The virtual coaching area can be used both as customized coaching and as a platform to introduce various financial products, including third party products brokered by the financial institution owning the financial advisor system.

Upon selection of a button depicted along the bottom of the screen, a particular feature of the financial management system is displayed. For example, selecting the learn button 234 may bring up a portion of the screen (or a new screen) that explains the functions and features of the financial management system. In an alternative embodiment, the learn button may be used to obtain specific information on the financial products presented to the user. The plan button 236 may display the LifePath model in time series form. A decide button 238 may display a screen that allows the user to make financial decisions, such as allowing a user to select transactions recommended by the advisor and/or the virtual coach. A transact button 240 may display a transaction screen on which the user performs transactions. A monitor button 242 may display current and/or historical information about transactions made by the user and/or financial performance.

Risk analysis may be integrated into the LifePath model 164 enabling clients to better understand their financial health and to improve trade-off decisions. Formulating a personal risk/reward strategy is difficult. The LifePath model 164 may support a risk simulator, showing how the ideal model would be impacted by typical life crises. The model can be played repeatedly with varying outcomes to foster an intuitive understanding of exposure and to provide grounded input into trade-off decisions. Using the risk modeling tools, the advisor can add value, consolidate the relationship and rationalize a stream of product sales.

Figure 8:
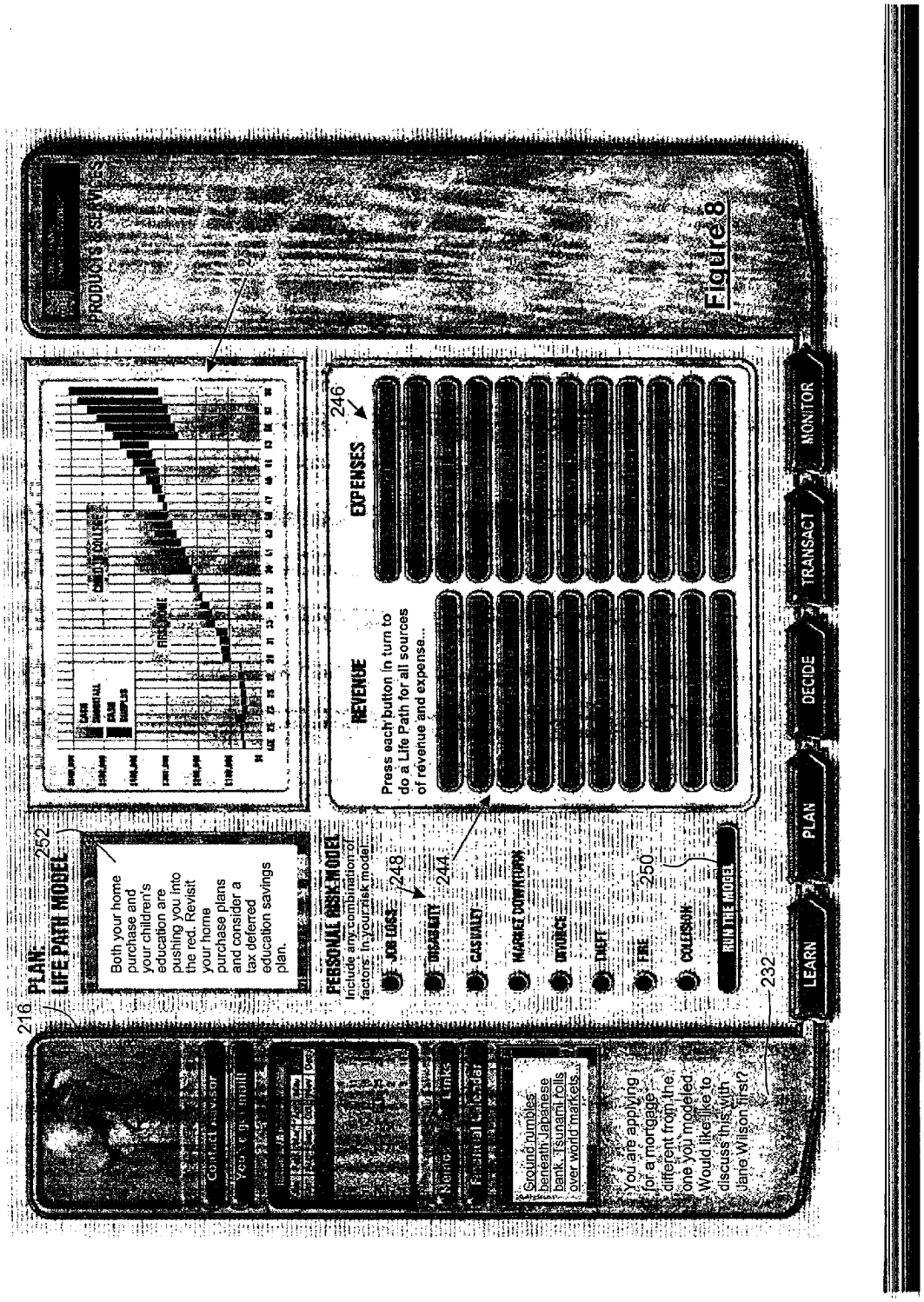
FIG. 8 is another illustration of a LifePath model web page interface.

As shown in FIG. 8, the LifePath model 164 captures the user's life intentions expressed as revenue intentions 244 and expense intentions 246. As discussed above, revenue intentions 244 are a summary of the user's expense information 246. The user is provided with an individual button for each of the income information categories 244. For example, the user can input their income information such as salary, investment, pension, alimony, or disability, or other financial information as shown in FIG. 8. Similarly, the user can input their expense intentions which are shown by the category of interactive buttons 246. For example, the user can input expense information such as housing, transportation, education, health care, or other expense information as shown in FIG. 8. Neither the income category nor the expense category is limited to the displayed icons. The "other" button under the revenue category enables the user to input user specific sources of revenue such as inheritance. Same flexibility applies to the expense category allowing the user to input types of expenses not categorized under the standard expense icons. The user may import his past revenue and expenses from financial programs such as Quicken™ or MS Money™ simplifying reducing the amount of typing necessary to do so.

Additionally, the user may control the level of risk that the model considers by selecting one or more of the graphical user interface ("GUI") elements from the list of risk events 248. The risk events 248 may include various life events that may affect the user's life path model. For example, the user can request that the model include job loss, disability, casualty, market downturn, or other personal risk factors into their life path model. In one embodiment of the present invention, the risk modeling component uses actuarial data from outside databases to supply the data related to the probability and the effect of the occurrence of a particular risk event. Alternatively, the user may estimate the impact of a particular risk event. For example a user may estimate the possibility of a job loss knowing his skill sets and the status of the job market. Furthermore, he can better predict the length of time he may be out of work. On the other hand automated coaching, based on actuarial and economic data, may estimate an average length of time a typical person in the user's field of expertise may remain out of work after a job loss. The user may accept or reject the automated coach's estimates and use his own information.

After providing the model with his or her life intentions expressed as revenue intentions 244 or expense intentions 246 in addition to any of the risk events, the user can select button 250 to run the LifePath model and initiate the advice generating subsystem. Accordingly, the user is provided with detailed advice in window 252 that is tailored to the user's life intentions and the risk events specified. As shown in window 252, the user is provided with a clear automated coaching tailored to his or her life intentions gathered by the LifePath model. Furthermore, the coaching incorporates the risk events specified from the risk factors 248. The graphical display 253 in FIG. 8 is a time series representation of the aggregated total of the user's cash flow over a selected period of time, based on the user provided revenue intentions 244 and expense intentions 246.

Additionally, the system provides the user with virtual coaching that watches the actions of the user while progressing through the LifePath model and provides the user with suggestions to ensure that they continue to comply with his or her life intentions.

In another embodiment of the present invention, the financial advisor system 102 includes a portfolio modeling tool subsystem 182. The user would get to the model either after having setup a financial profile through the LifePath model 164 or he can access the financial portfolio building model directly.

Figure 9:
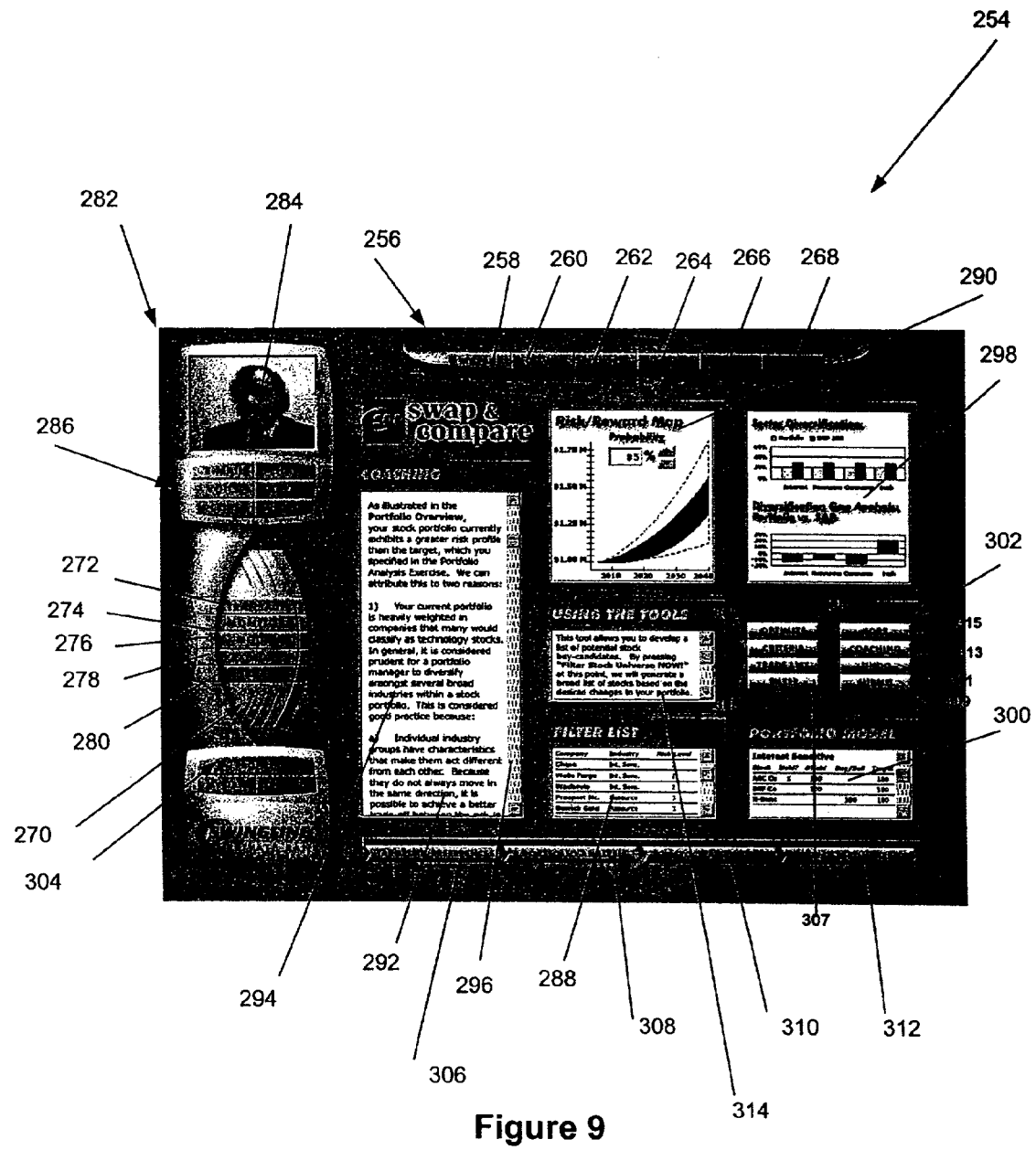
FIG. 9 is an illustration of a investment portfolio generator web page interface.

FIG. 9 is an exemplary graphical user interface 254 that embodies the various concepts and methods set forth for financial portfolio modeling in one embodiment of the present invention. As shown, the graphical user interface 254 includes a plurality of fundamental selection icons 256 including a "my page" icon 258 for displaying a graphical user interface specifically tailored for a particular user, a "save" icon 260 for saving any changes made to the graphical user interface 254, an "export" icon 262 for exporting data displayed by the graphical user interface 254, a "print" icon 264 for printing various fields of the graphical user interface 254, a "help" icon 266 for obtaining help information, and an "exit" icon 268 for exiting the graphical user interface 254.

"My page" icon 258 displays a web page that can be customized to each user's need, simplifying the use of the portfolio model 182. In one embodiment of the present invention, the portfolio modeling system may use the Open File Exchange (OFX) protocol which has become the standard protocol for the exchange of financial information over a wide area network, and particularly the internet. Thus exported data from the portfolio modeling system into other financial programs is formatted to be easily usable by these programs.

Further displayed on the graphical user interface 254 may be a plurality of mode icons 270 for initiating various modes of operation. The mode icons 270 may include a transact icon 272 for initiating transactions involving the purchasing and selling of investments utilizing a network, a monitor icon 274 for monitoring the performance of the investments, a model icon 276 for generating an investment model based on criteria entered by the user, an explore icon 278 for retrieving information on the investments, and a track icon 280 for tracking the investments utilizing the network. In the preferred embodiment of the present invention, the Wide Area Network 104 is the Internet and the portfolio modeling system 182 has access to outside databases such as Reuters and Bloomberg for historical and current securities pricing and market indexes.

With continuing reference to FIG. 9, a communication medium 282 may be employed to converse with other users, namely financial advisers, etc. Such communication medium 282 may include a window 284, and a plurality of communications icons 286 that enable various types of communication between the user and the live coach or advisor. Such communications icons 286 include an e-mail icon, a chat icon, a voice icon, a talk icon, a clips icon, and a video icon. The mail server 116 and call center 118 allow the user to contact the advisor by email or telephone call. The mail server may further support live chat and voice over the network as well as a collaborative medium such as a white board. Depending on the bandwidth available to the user, he may receive still pictures or live streaming video of the advisor, or he may see an animation.

The incorporation of the various communication technologies and programs within the context of a financial advising system is further described in a related application named Communication Interface for a "Financial Modeling and Counseling System", application Ser. No. 09/705,290, by the same inventors as the present application, filed on the same day, and incorporated herein by reference. Also, the graphical user interface of FIG. 9 is further described in the U.S. related application by the same inventors, titled: "A User Interface for a Financial Modeling System", application Ser. No. 09/704,838, filed on the same day as the present invention and herein incorporated by reference.

A filtering field 288 is also shown in FIG. 9. Such filtering field 288 may include a plurality of companies and associated risk levels and industries which are displayed in accordance with the user's appropriate tolerance to risk and investment style. A risk/reward map 290 is also shown displaying the probability of the user reaching his financial goals. Also shown is a coaching window 292 for displaying coaching strings 294 based on a rule-based automated coaching engine. Such window 292 may include a field adjustment bar 296 in order to facilitate viewing of the coaching strings 294.

Further features associated with the graphical user interface for the portfolio modeling 182 include an information window 298 which illustrates various charts pertaining to sector diversification and other investment parameters. A portfolio model window 300 may also be displayed for portfolio modeling purposes. It should be noted that the various services provided by the present invention may be initiated by selecting corresponding service icons 302. The optimize icon 301 optimizes a securities list based on the newly specified criteria. The criteria icon 303 enables the user to introduce additional criteria for selecting a particular security. The trade list 305 displays the system recommended securities that should be sold based on the user criteria and his personal financial parameters. The filter icon 307 generates a filtered list of securities displayed in the filtered list window 288. Sort icon 315 sorts the list of securities based on a user selected criteria such as alphabetical order. The coaching icon 313 generates context sensitive coaching related to the user's financial portfolio. The undo icon 311 undoes a specific swap of securities. The submit icon 309 submits and the user changes to his portfolio during the current session.

Further, a profile may be viewed and adjusted using a plurality of profile icons 304. This ease of use helps the user to feel comfortable with the system and trusting of it, allowing him to take full advantage of the all the integrated features of the system.

The user may set a targeted goal for his investment portfolio as well as his preferences by selecting the target and preference icon 306. He may do an analysis on his past or present portfolio by selecting the portfolio analysis icon 308. He may trigger specific coaching on specific a security or group of securities or even on whole industry sectors, as well as request more detail information by selecting the stock analyst icon 310. He may further model and analyze the effect of inclusion or exclusion of particular securities on his portfolio by swapping stocks in and out of the portfolio 312.

When selecting a particular icon corresponding to the various tools, a corresponding help text string appears in the help screen 314, directing the user on how to use the particular tool.

Figure 10:
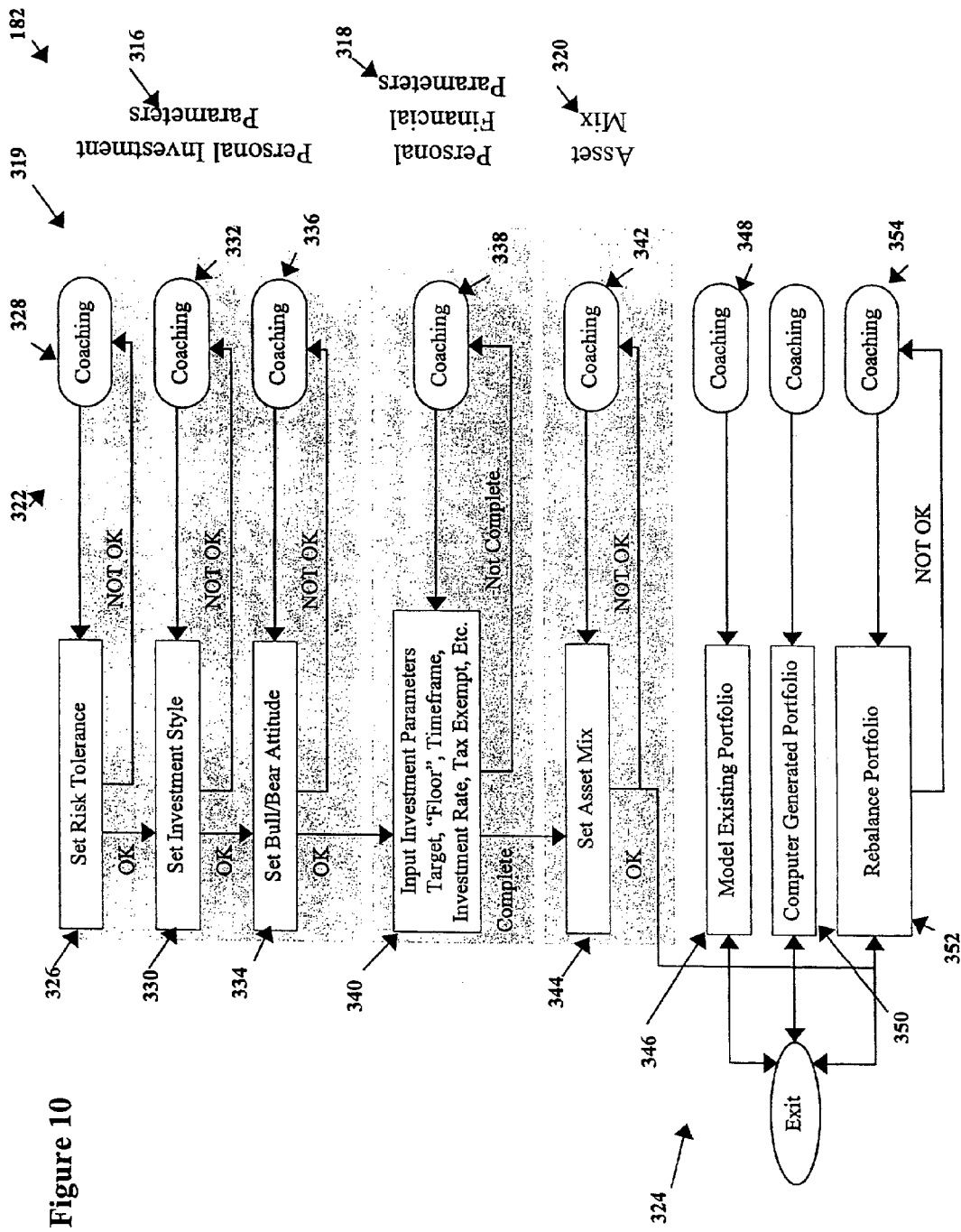
FIG. 10 is a flow diagram of an operation of the Investment Portfolio generator in accordance with a preferred embodiment.

FIG. 10 illustrates an investment portfolio management method utilizing automated coaching in a network based financial framework. First, in operation 319, a plurality of parameters may be set for a subject utilizing a network. The parameters include personal investment parameters 316, personal financial parameters 318, and/or asset mix parameters 320. Such parameters may include a minimum retirement, target floor, investment rate, tax implications, etc. In operation, the parameters may be selected manually by the subject using a desired graphical user interface, or by a third party. Parameters such as target floor may be based on the subjective determination by the user of the minimum standard of life he is willing to accept in a future time, such as in his retirement. Based on this determination, the user or a third party may determine the size of the investment portfolio required to support that life style.

Next, the network may be utilized to provide the subject coaching from an investment coaching engine in operations 322, where such coaching relates to the setting of the parameters. The coaching may be provided by utilizing a look-up table which is capable of generating various combinations of advice based on the settings. In the alternative, the advice may be generated using any other type of artificial intelligence system.

At least one financial model for a portfolio of the subject is subsequently generated in operation 324 based on the setting of the parameters. This may be generated using a system similar to that which generates the coaching, or any other desired means. The network is again used to provide coaching from the investment coaching engine to the subject with the coaching relating to the generated financial model.

As shown in FIG. 10, the personal investment parameters may include a risk tolerance parameter 326. Further, the coaching by the coaching engine 328 may provide a textual risk tolerance profile for the subject based upon an interpretation of current risk tolerance parameters of the subject as textual analysis.

Further, the personal investment parameters may include an investment style parameter 330. In such embodiment, the coaching by the coaching engine 332 provides a textual investment style profile for the subject based upon an interpretation of current investing style parameters of the subject as textual analysis.

In yet another embodiment of the present invention, the personal investment parameters may include a bull/bear attitude parameter 334. A bull attitude is one of optimism that the stock market will go up, while a bear attitude is where the user believes the stock market would go down. In the present embodiment, coaching by the related coaching engine 336 provides a textual description of an implied future of financial markets and graphs showing forecast curves of financial markets based upon the building of financial market forecasts which are, in turn, based upon evaluations from financial experts.

In one embodiment, the coaching by the coaching engine 338 related to establishing the personal financial parameters in operation 340, provides an alert if the investment parameters of the subject conflict with LifePath cash flows or personal parameters based on a consistency check of the investment parameters with data obtained from a LifePath model 164 and personal investment parameters.

With continuing reference to FIG. 10, the coaching by the coaching engine 342 related to the setting of the asset mix parameters in operation 344 provides a rationalization of the asset mix based on personal and financial parameters of the subject and at least one computer generated asset mix. A pie chart may also be included that represents a portfolio showing the subject's assets.

In still another embodiment, the financial model comprises a model of an existing investment portfolio of the subject. Note operation 346. The coaching by the coaching engine 348 provides an analysis of market-related growth by security and sector, trend analysis, fee and service analysis, and/or dividend and interest impact based upon transaction history and current market values of the existing investment portfolio. The coaching by the coaching engine 348 may also provide an analysis of growth, risk and value of the existing investment portfolio based on market data and expert analyst opinion.

Still yet, the coaching by the coaching engine 348 may provide an evaluation of the existing investment portfolio relative to the personal and financial parameters of the subject based on a comparison of growth and volatility projected forecasts to the personal and financial parameters of the subject. It should be noted that similar capabilities may be provided using a model based on a computer generated portfolio in operation 350.

In operation 352, the financial model may include a model of an investment portfolio of the subject generated by the subject alone or with the input of a private banker. Coaching by the coaching engine 354 provides an analysis of growth, risk and value of each security in the investment portfolio based on a concatenated, user-friendly English format of market data and expert analyst opinion obtained utilizing the wide area network 104.

Further, the coaching by the coaching engine 354 may provide an evaluation of the contributions of securities in the investment portfolio relative to the personal and financial parameters of the subject based on a comparison of the personal and financial parameters of the subject to an analysis of risk compliance, growth, and volatility. The automated coaching engines mentioned above are further described in the related U.S. application titled: "Automated Coaching for A Financial Modeling and Counseling System" by the same inventors as the present application, Application Ser. No. 09/705,255, filed on the same day as the present application and herein incorporated by reference.

Typically, most of today's average investors know relatively little about the technicalities of investing. In one embodiment of the present invention, a financial risk management sub-system may include traditional fundamental/technical data and analyst interpretation. Much of this is meaningless to the average investor however. The present invention's approach meets their information and learning requirements in these ways. First it develops detailed profiles of the user's investment personality and customizes all information such as coaching to the user profile. Second the system uses coaching engines to translate fundamental and technical data into natural language textual coaching string outputs, customized to the user. Furthermore, the financial modeling and counseling system alerts the user to investment activities which are incompliant with his personal investment parameters such as his risk tolerance, investment style and so on . . . . The financial modeling and counseling system further provides automated coaching throughout the investment process.

Risk tolerance, investment style and financial outlook are established through a series of interactive multimedia-based scenarios which unfold online. These exercises provide immediate coaching feedback to the user. The results are stored as a multidimensional profile, which is used by modeling and coaching activities throughout the portfolio management process.

Figure 11:
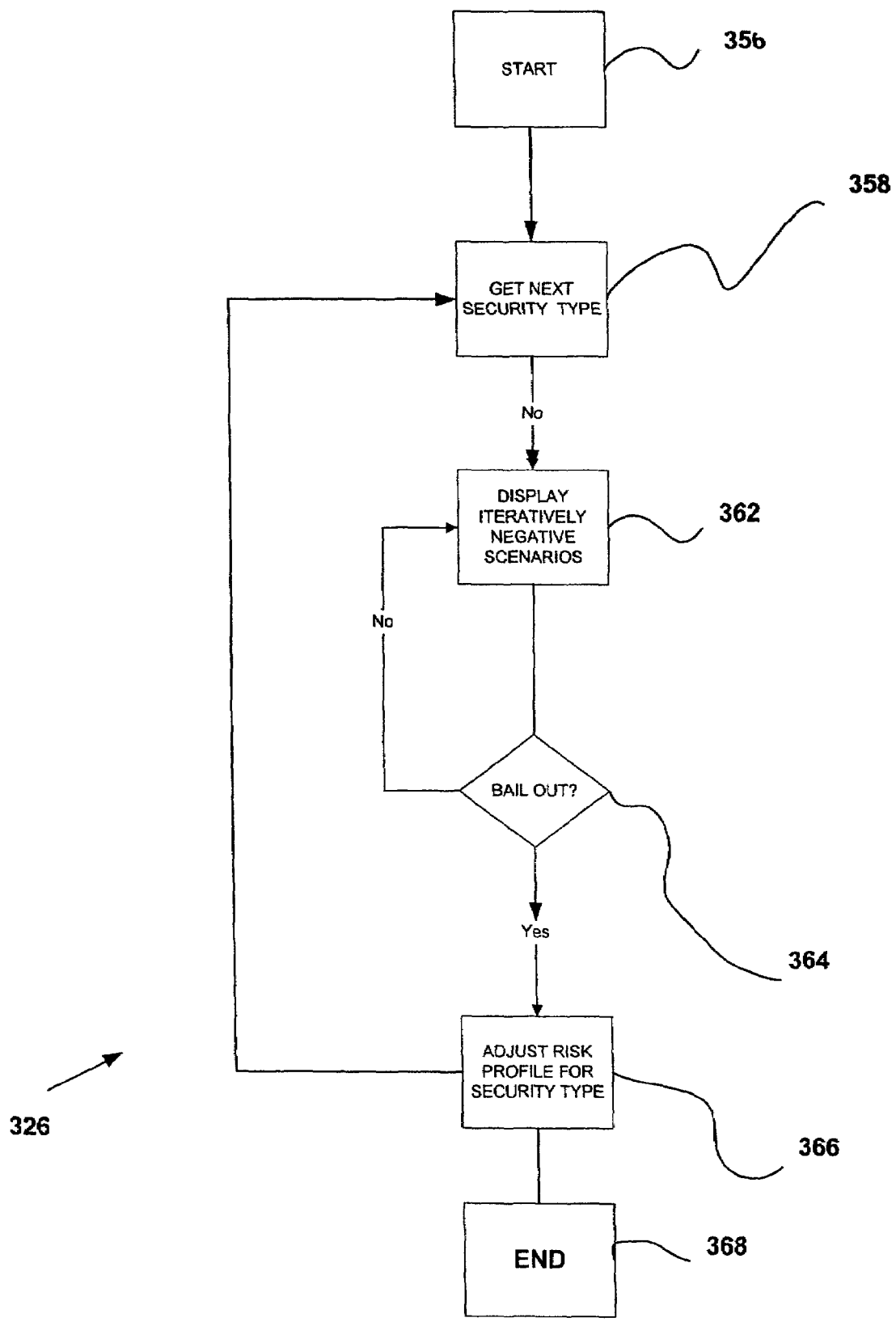
FIG. 11 is a flow diagram of how to set risk tolerance operation in greater detail.

FIG. 11 is a flow diagram illustrating the set risk tolerance operation 326 in an embodiment of the present invention. At the start at 356, he is prompted for the security type to be used for risk profiling 358. Next, an iteratively negative financial scenario is presented to the user and he is asked if he wants to bail out once confronted with this scenario 362.

The negative scenarios presented to the user are generated by the coaching engine 328 and may include scenarios such as negative news related to a particular security and the company's future growth or performance and profitability. Faced with this situation, the user may decide to hold on to the particular security or sell and bail out. In one embodiment of the present invention the representations may include both textual and graphical representation, and may further include headline news indirectly related to the particular company. Alternatively, the scenario generated may encompass as whole sector or industry such as the interest sensitive construction industry. Both indirect economic news such as a forecast of future interest rate and direct economic news such as declining housing starts or sales of new homes are presented to the user, and his reaction to the negative news is indicative of his personal risk tolerance. If the user selects to bail out 364 based on the negative financial scenario, his risk tolerance profile is adjusted accordingly 366. If the user refuse to bail out, he is confronted with iteratively more negative market scenarios 360 and again he is given the option to bail out 364. Depending on when the user selects to bail out 364, the system adjusts the user risk profile for that security type 366. The process is repeated for other types of investment such as Retirement, Tax deferred environment. At the end of the process, the automated coaching generates coaching to describe the user's risk tolerance profile at 366 and the process is complete at 368. Alternatively, the user's risk tolerance level can be set manually by a third person such as the live advisor or even possibly by the user himself. The setting of personal investment parameters 316 is further described in the related U.S. application Ser. No. 09/705,287 titled Financial Portfolio Risk Management System, by the same inventors as the present application, filed on the same day as the present invention and herein incorporated by reference.

Figure 12:
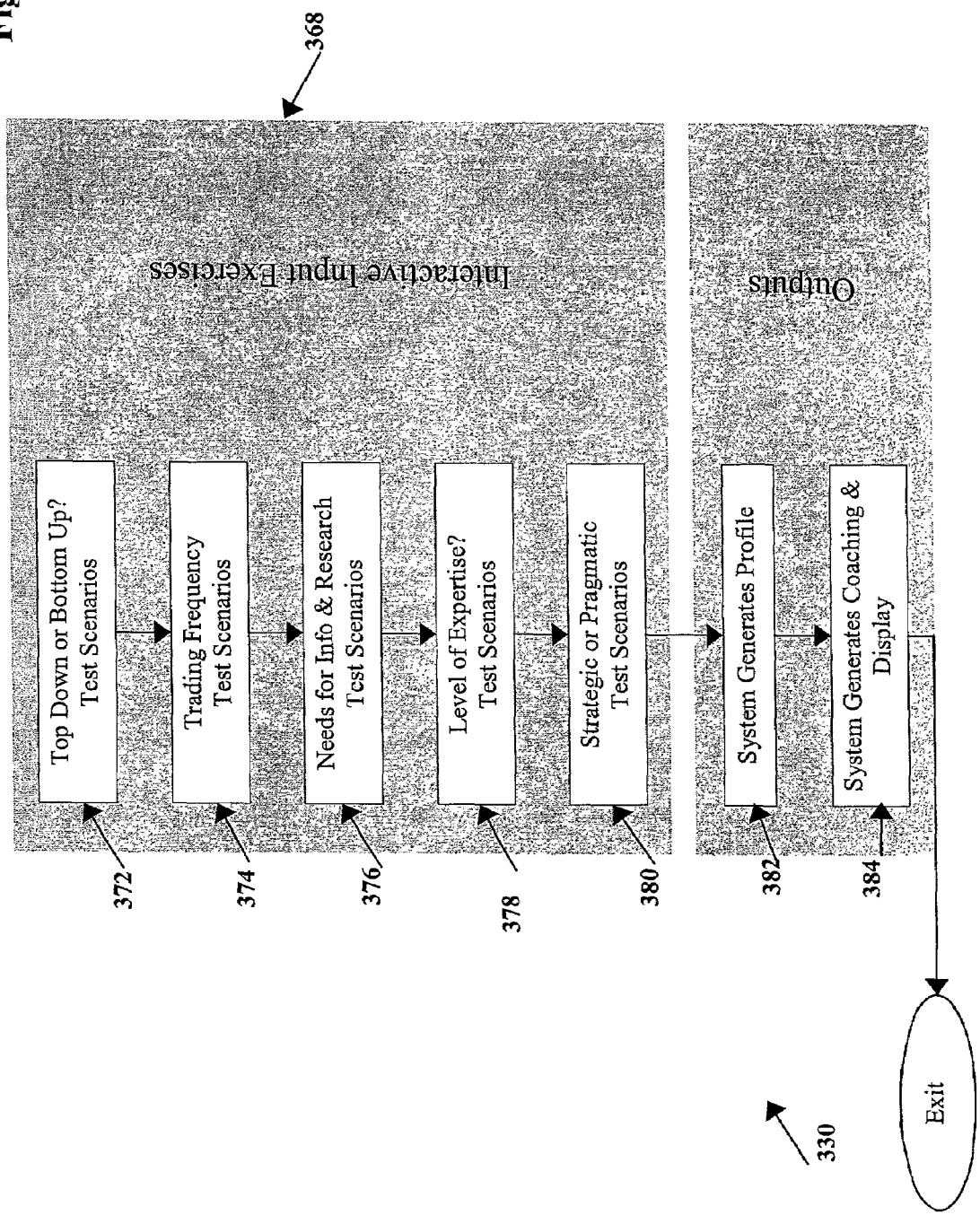
FIG. 12 is a flow diagram of how to set investment style operation in greater detail.

FIG. 12 illustrates a flow diagram for determining an investment style in a network-based financial framework. The present technique is intended to not just ask questions, but provide scenarios. It sets up a portfolio of stocks that an investor can trade or not trade on these fictitious stocks, and provides examples of how the stock market can move. The present method develops a profile and helps target information effectively for the particular person. Coaching is strategically designed to keep the risk minimal by avoiding telling what someone should do. Scenarios will also identify areas of weakness in one's knowledge.

In one embodiment, the interactive input exercise may include top down or bottom up test scenarios 372, trading frequency test scenarios 374, needs for information and research test scenarios 376, level of expertise test scenarios 378, and/or strategic or pragmatic test scenarios 380. For example, a bottom up investor would start with a vision of the economy and decide what to invest in, and then they would look at one stock at a time and make a decision. Trading frequency is used by the system to project the user's portfolio performance in the future by taking into account trading cost. Level of expertise scenarios may be used to customize coaching strings and the level of explanation put forth by the automated coaching.

In use, an investment profile of the subject is generated based on the at least one interactive input exercise in operation 382. Coaching is also provided for the subject based on the generated investment profile. A display may be generated for the subject based on the generated investment profile. Note operation 384. In one embodiment of the present invention, the user may reject his investment style parameter as presented to him by the automated coaching and go through the process 370 to reset his investment style parameter.

Figure 13:
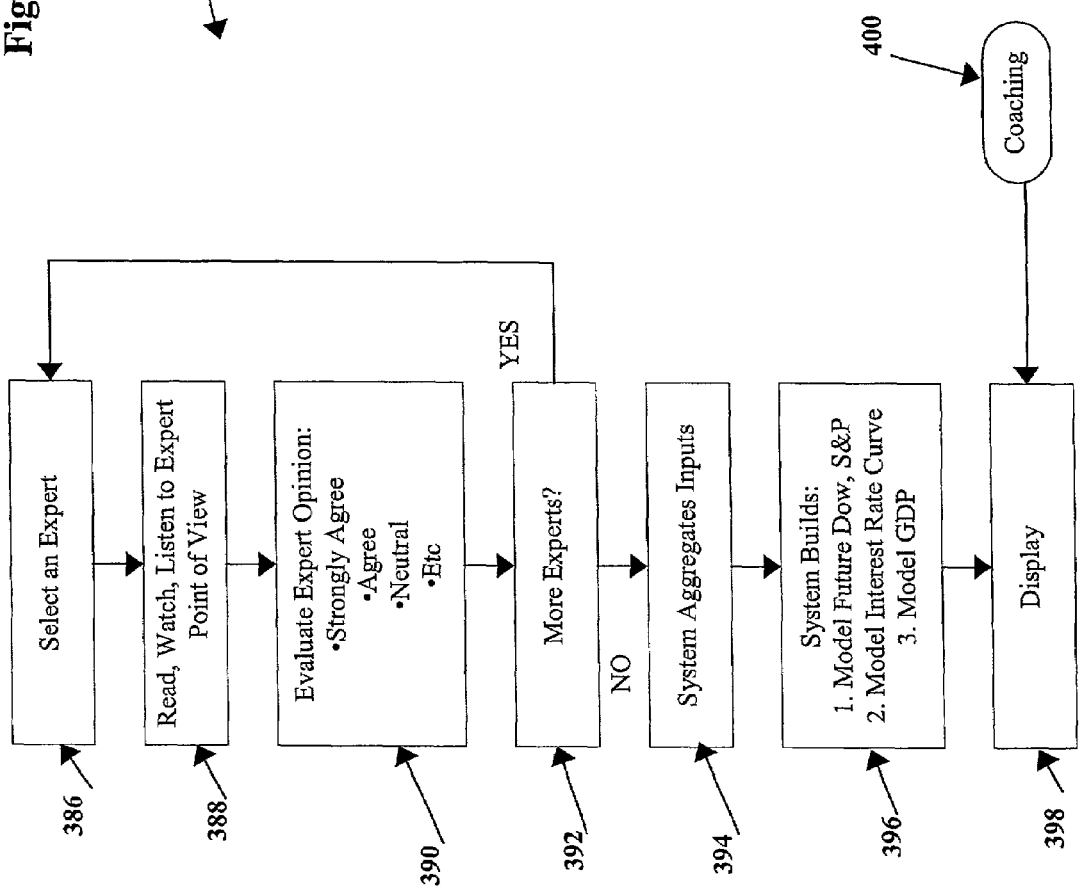
FIG. 13 is a flow diagram of how to set Bull/Bear attitude operation in greater detail.

FIG. 13 illustrates a flow diagram for the "set Bull/Bear attitude" in operation 334. The instant aspect of the present invention is able to come to a conclusion about a person. For example, it may determine how confident a person is about the future. Online polling is one technique that allows the present invention to become the basis of a customer's long-term parameters. It achieves a systematic attempt to capture one's perspective on the economy as a whole. First, an expert is selected utilizing a network in operation 386.

Next, an opinion from the expert is rendered utilizing the network and witnessed in operation 388. At least one evaluation of the expert's opinion is then received from a subject utilizing the network. Note operation 390. As an option, the step of obtaining the evaluation may be accomplished by displaying to the subject a plurality of choices for expressing the subject's agreement with the opinion of the expert, receiving a selection of one of the choices from the subject utilizing the network, and storing the selection. In one aspect of the present invention, the plurality of choices displayed to the user may include the following: strongly agree with the opinion, agree with the opinion, neutral to the opinion, disagree with the opinion, and/or strongly disagree with the opinion.

In operation 392, the subject may be permitted to select at least one other expert utilizing the network after which operations 386-390 of the present invention may be repeated. The evaluation (s) may then be aggregated from one or more subjects, as indicated in operation 394.

Thereafter, in operation 396, at least one financial model is built based on the aggregated evaluation from the subject. As an option, the financial model may be selected from a model based on the future of a financial index, a model based on an interest rate curve, and a model based on a gross domestic product (GDP). Further, the financial model is displayed in operation 398 utilizing the network. In one aspect of the present invention, the subject may be coached utilizing the network. See operation 400. Such coaching may be based on the financial model. The coaching would analyses the user's market attitude (bull/bear attitude) and explain the resulting market model in natural language. The resulting market attitude would be used by the modeling and coaching engines to project the user portfolio's growth over a period of time. Once the user has quantified his market attitude through operation 334, he presented coaching advice that includes the user's market attitude in all future analysis.

Once personal investment parameters have been identified, the user is prompted to input some basic personal financial parameters 318. Unlike the Personal Investment Parameters, which are largely qualitative, the Personal Financial Parameters are quantitative. They may include, initial and target values of the portfolio, the user's investment time frame, and whether the portfolio is a tax exempt IRA, 401K or Canadian RRSP One important datum is the "floor." In a retirement portfolio, this would be the bare minimum acceptable lifestyle the customer would be prepared to accept. The risk model used for analysis projects the portfolio value forward compounded at its current rate of growth. Surrounding the forecast line there are risk bands showing best and worst case scenarios given the aggregated volatility of all contained securities. The bands are preferably defined for example, by Bell curve theory and represent a sigma value related to the confidence level the customer requires in the forecast. The greater the confidence required, the wider the bands. If the "floor' value ends up within the bands, the customer is at risk of an unacceptable retirement. The customer can settle for less confidence in the portfolio projection. He may also optimize a portfolio that hits the target with lower risk using the automated coaching to guide him. He may further accept a lower target at lower risk and rebalance his portfolio. He may simply lower his "floor" or decide to increase his contribution. Once the user's personal investment parameters and user's personal financial parameters have been established, the system sets the asset mix 320.

Figure 14:
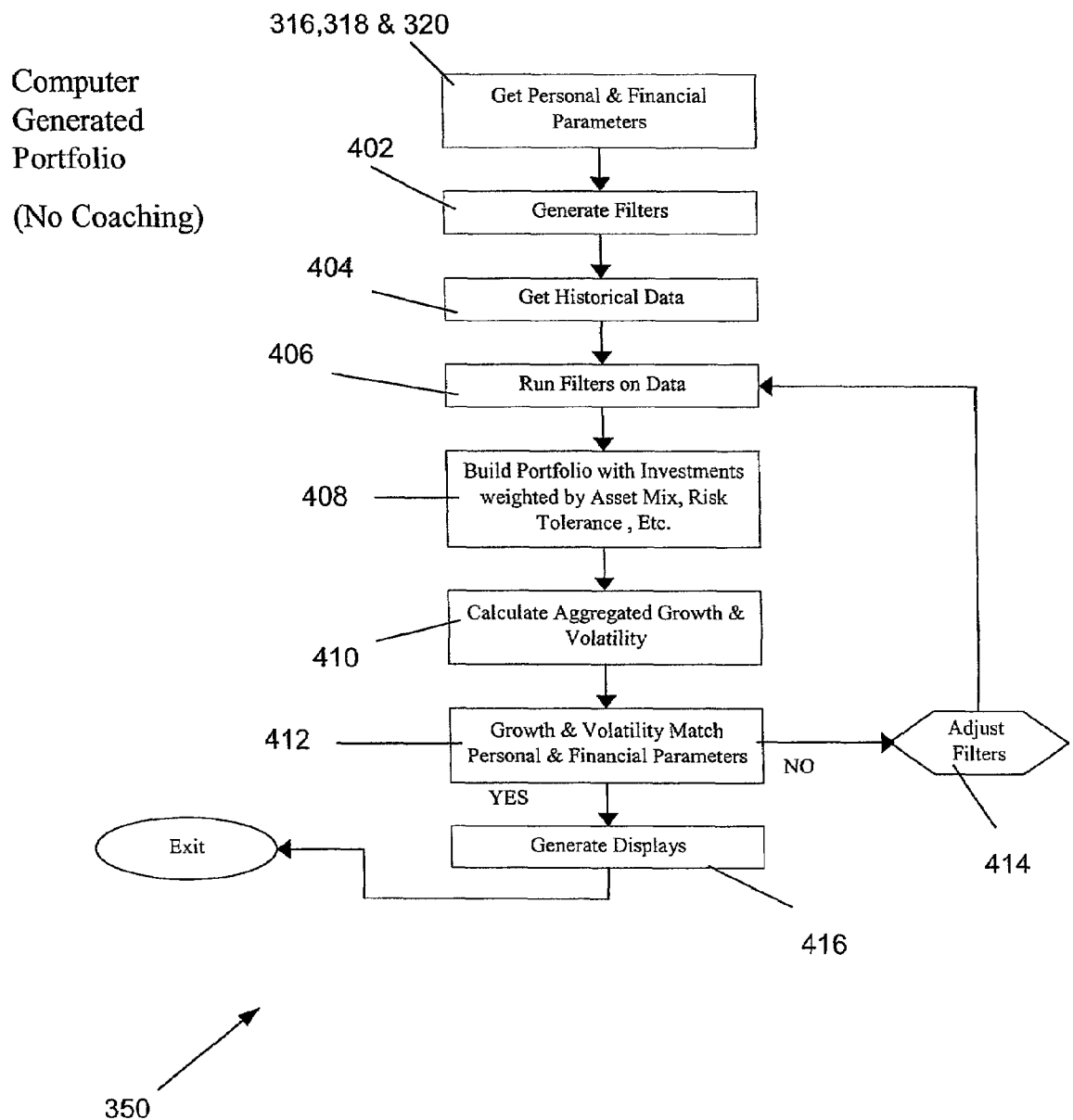
FIG. 14 is a flow diagram of how to build a computer generated portfolio.

FIG. 14 is a flow diagram illustrating a method for automated portfolio generation utilizing a network. Three powerful portfolio tools use the personal and financial profile parameters as inputs. A tool may be used to create a customized portfolio automatically. It may create an ideal proportional breakdown of security types based on the customer's personal and financial investment parameters. Having created a set of filters, it may then select appropriate securities of each type at the right level of risk and volatility, validate the aggregated growth and volatility, and iterate if necessary. This risk modeling tool may be used by the user or by the live advisor to on the customer's behalf. The risk modeling sub-system allows to automatically analyze an existing portfolio, or to swap stocks in and out of the portfolio with automated coaching or the live advisor's help.

First, in operation 316,318 & 320, financial information is received from a subject utilizing a network. In one embodiment of the present invention, the financial information of the subject includes personal investment parameters 316 and/or personal financial parameters 318 of the subject.

Filters are then generated based on the received information of the subject in operation 402. Thereafter, historical data may be obtained on investments utilizing the network. Note operation 404. The historical data on investments is then filtered in operation 406 with the generated filters. Using the filtered data, a financial portfolio may then be generated for the subject in operation 408. Further, the filtered data may be weighted by an asset mix and/or risk tolerance of the subject.

In operation 410 shown in FIG. 14, aggregated growth and volatility may be calculated based on the built financial portfolio. Further, it may be determined whether the aggregated growth and volatility match the financial information of the subject. Note operation 412. When it is determined in decision 414 that the aggregated growth and volatility fail to match the financial information of the subject, the filters may be adjusted. Such filters are adjusted until the aggregated growth and volatility match the financial information of the subject. Finally, in operation 416, displays are generated based on the built financial portfolio.

Figure 15:
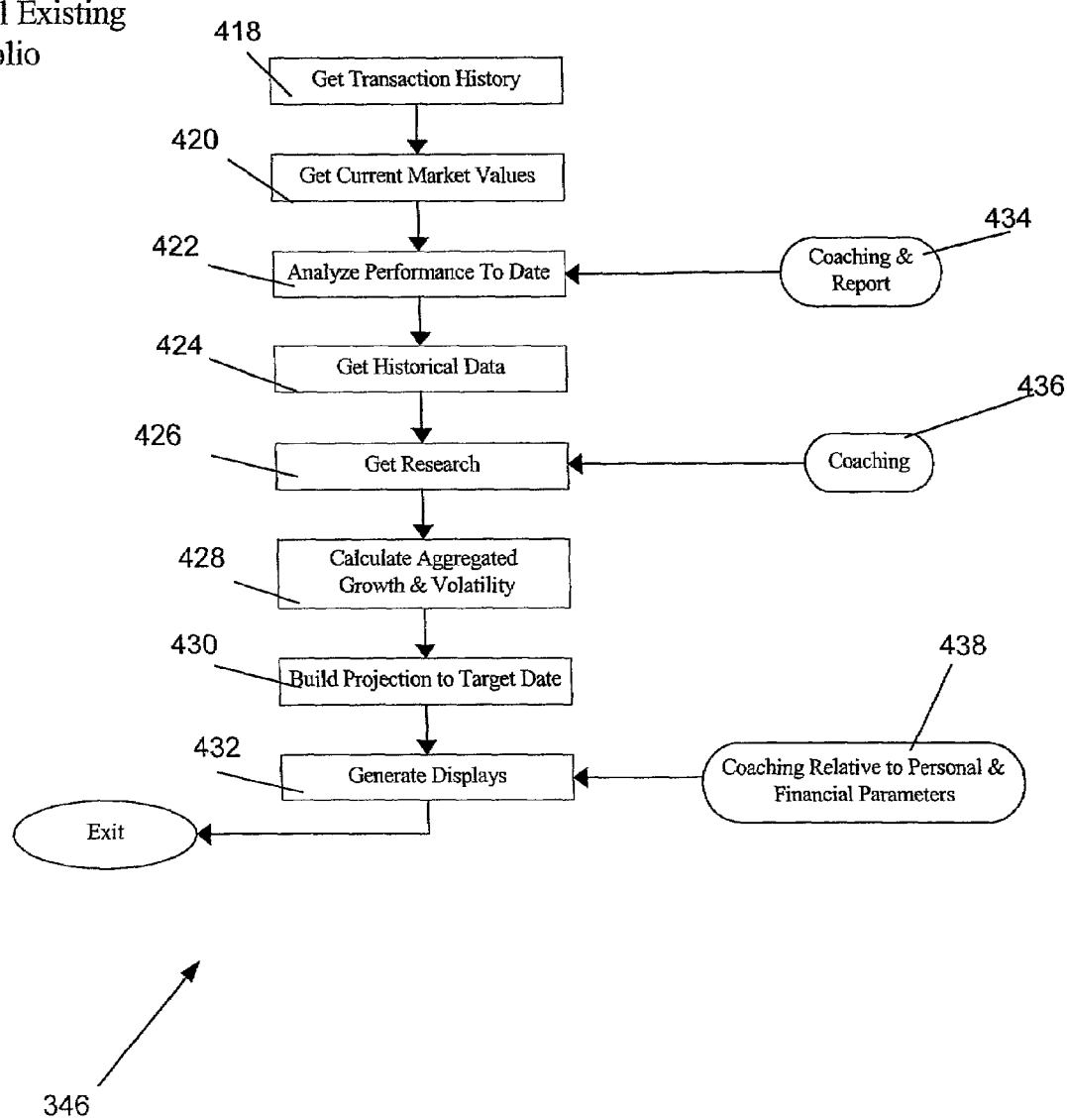
FIG. 15 is a flow diagram of how to model an existing portfolio.

FIG. 15 illustrates a flow diagram for modeling an existing financial portfolio. First, the performance of at least one investment of a subject is determined utilizing a network. As shown, evaluating the performance of the investment includes obtaining a transaction history of the investment in operation 418, obtaining a current market value for the investment in operation 420, and analyzing the performance of the investment based on the transaction history and the current market value of the investment. Note operation 422. Next, financial information is obtained relating to the investment of the subject. The step of obtaining the financial information relating to the investment may include obtaining historical data on the investment in operation 424, and obtaining research relating to the historical data of the investment in operation 426.

With continuing reference to FIG. 15, the aggregated growth and volatility of the investment is calculated in operation 428. Such calculation may be performed based on bell curves, and other statistical techniques. Best case and worst case scenarios may also be produced.

A projection to a target date is subsequently built for the investment. Note operation 430. This is done based on the determined performance of the investment, the financial information relating to the investment, and/or the calculated aggregated grown and volatility of the investment. Finally, displays are generated based on the built projection. Note operation 432.

As shown in FIG. 15, coaching and a report 434 may be provided to the subject utilizing the network based on the determined performance of the investment. Further, coaching may be provided to the subject utilizing the network based on the obtained financial information relating to the investment. Note operation 436. Such network may also be used to provide coaching in operation 438 with the generated displays relative to personal and financial parameters of the subject.

Figure 16:
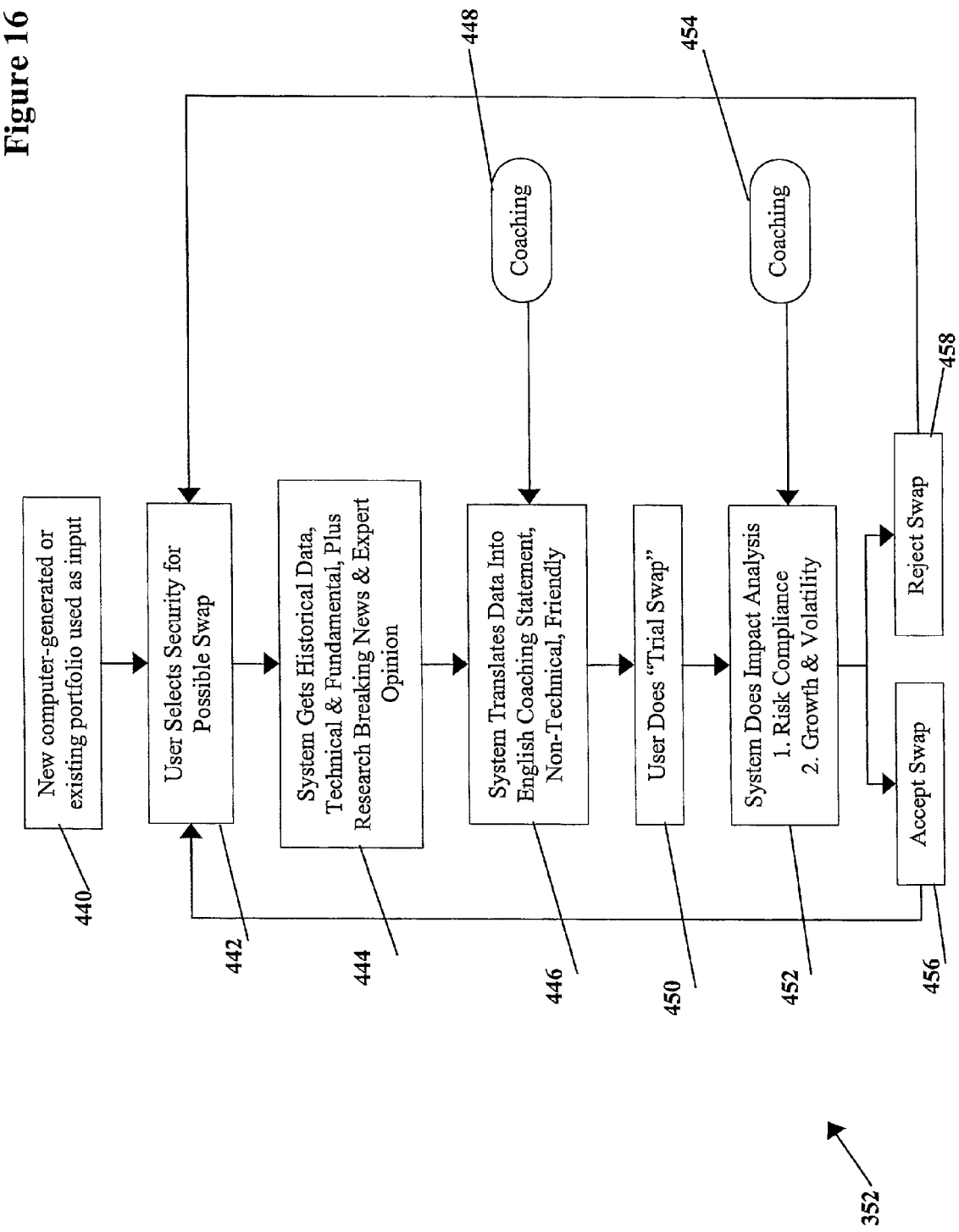
FIG. 16 is a flow diagram of how to rebalance a portfolio.

FIG. 16 illustrates a flow diagram of a process 352 of FIG. 10, to rebalance a portfolio with the aid of the automated coaching 352 in an embodiment of the present invention. In the first step the modeling system creates a portfolio model using either an existing portfolio or starts with a computer generated portfolio 440. Next the user selects security from the list of filtered securities for possible "swap" or exchange with securities already in the portfolio 442. The securities are filtered based on the user's personal investment parameters 316 and the user personal financial parameters 318. For example, securities with higher Value At Risk coefficient than the permissible user risk tolerance are rejected. Securities are selected from user preferred industry sectors such as electronics or transportation. The system obtains historical data, technical and fundamental data, and research and breaking news or expert opinion, all pertaining to the particular security 444. The coaching engine converts the data into natural language, non technical coaching strings 446. Automated coaching provides analyses of the technical and fundamental data and provides growth, risk and value analysis for each security selected 448. After the automated coaching output, the user may elect to do a "trial swap" of the security and observe the impact of the swap 450. The modeling system recalculates the portfolio model including the added securities and the subtracted securities. The system further does a risk compliance to meet the with the user's personal investment profile 452. Furthermore, the new portfolio's growth and volatility are analyzed by the system and the automated coaching engine translates the effect of the swap on the portfolio performance in non technical natural language 454. If the user is satisfied with the resulting swap he may accept it 456. If he is unsatisfied with the security swap, he may reject it 458. In one embodiment of the present invention, the user may place an order to purchase the particular security through the financial modeling system, using the network.

Figure 17:
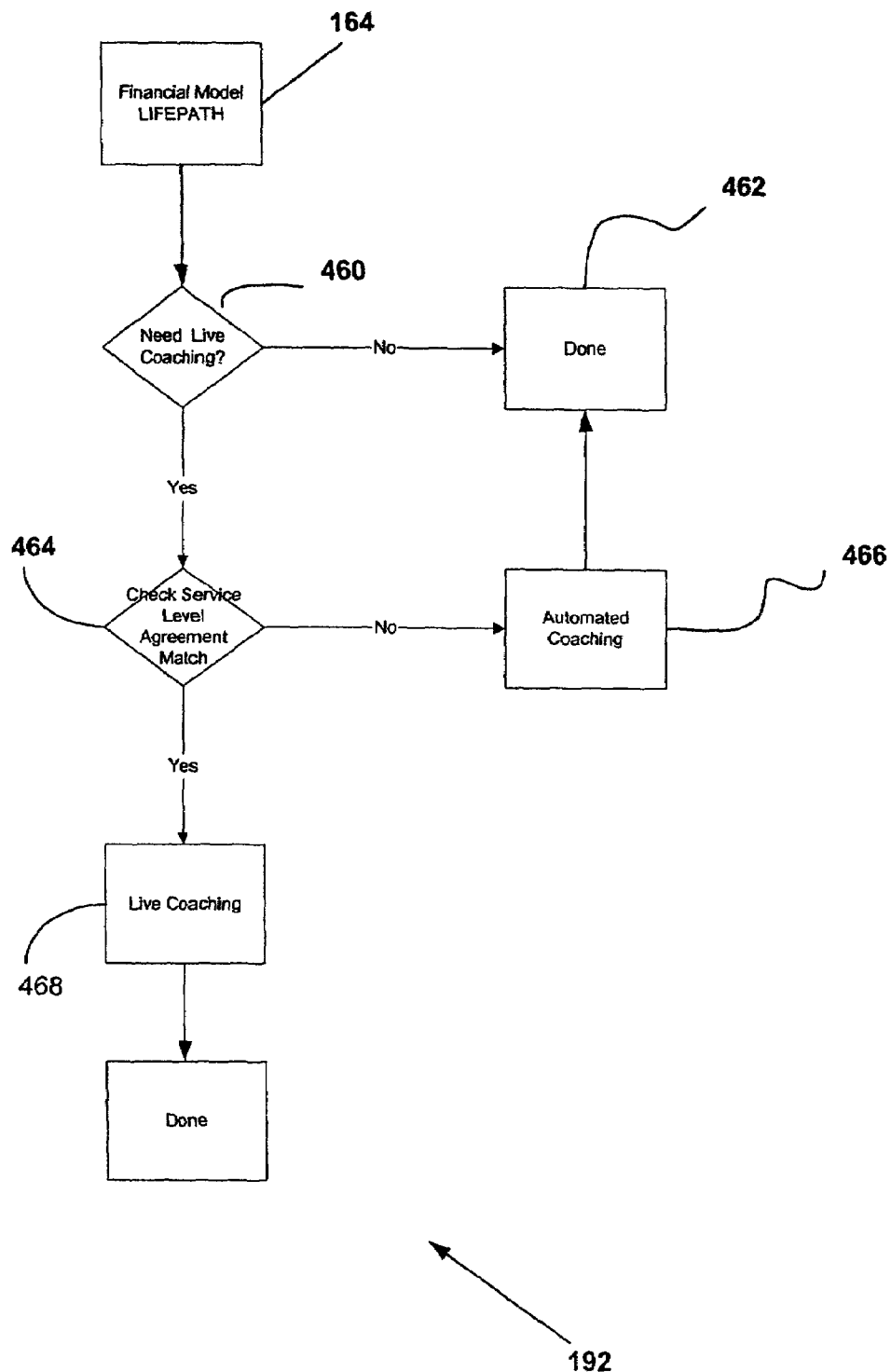
FIG. 17 is a flow diagram of an automated coaching and live advisor subsystems in accordance with a preferred embodiment.

FIG. 17 is flow diagram of an example of one embodiment of the automated and live coaching subsystem 192 for the LifePath model 164. The user has access to an automated coach or a live one at all level of the financial counseling model 102.

Once the user has setup his financial model, he may be prompted on whether he needs live coaching 460. If the user selects live coaching 468, the system checks the service level agreement 161 for the level of services included in agreement 464. If live coaching is part of the service level agreement available, the system would establish connection with a live coach 468 via live streaming video, still pictures, streaming audio, email, live chat, or direct telephone. In one embodiment of the present invention, the user's selection of the communication medium may also be restricted by the level of service selected. If the service level agreement 161 does not authorize this level of service, the user is limited to accessing an automated coach 466. In one embodiment of the present invention, the service level agreement may limit the user's access to automated coaching. The system may prompt the user on the need for more coaching and direct more coaching strings to the user screen based on the level of service selected. The automated coaching 466 may also encourage the user to increase his level of service, so that he may benefit more fully from all the financial management system has to offer.

The various embodiments described above are provided by way of illustration only and should not be constructed to limit the invention. Those skilled in the art will readily recognize the various modifications and changes which may be made to the present invention without strictly following the exemplary embodiments illustrated and described herein, and without departing from the true spirit and scope of the present invention, which is set forth in the following claims.

What is claimed is:

1. A method for providing online, web-based financial counseling over the Internet comprising:
providing a plurality of unique service levels, each including a unique combination of available computer coaching and live coaching, the live coaching being performed by a financial advisor;
developing a service agreement with a user for a desired service level of financial counseling services, including:
prompting the user to input personal financial information;
receiving from the user a desired service level selected from the plurality of available unique service levels;
estimating profitability based on the financial information; and
negotiating fees to be charged to the user based upon estimating profitability and the desired level of service prior to providing services under the service agreement;
analyzing, with the services provided by the service level, the financial needs of the user based on the financial information of the user, including processing the user's intended financial state, analyzing the user's investment portfolio, calculating the user's future income and expenses, assets, and liabilities, and factoring in risk events;
providing the financial advisor with the personal financial information and analysis of the financial needs of the user, detailing areas of the financial needs that require attention;
developing a financial model for the user to address the financial needs of the user by utilizing the computer coaching and the live coaching, including permitting the user to enter a dialogue with a computer-generated coach and the financial advisor over the Internet as determined by the service level agreement, and permitting the user to initiate communication with the financial advisor to obtain live coaching during the computer coaching dialogue; and
using the financial model utilizing said computer coaching and said live coaching as determined by said service level.

2. The method of claim 1 wherein the service level agreement includes a determination of access to at least one account of a user.

3. The method of claim 1 wherein the financial model includes developing a user's equity investment portfolio.

4. The method of claim 3 wherein developing an equity investment portfolio comprises:
- determining the financial goals of the user and the user's risk tolerance;
- determining the current equity positions of a user; and
- suggesting new equity positions for the user.

5. The method of claim 1 wherein below a certain service level threshold, a user must use computer coaching prior to using live coaching.

6. The method of claim 5 wherein said automated coaching may dispense general financial advice based on the user's financial model.

7. The method of claim 5 wherein said live coaching may dispense specific financial advice based on the user's financial model.

8. An online, web-based financial advisor system accessible over the Internet comprising:
- a user computer system coupled to a wide area network, including:
  - a user interface for prompting a user for an input of financial information;
  - a database for receiving from the user a desired service level selected from a plurality of available unique service levels;
  - an engine for estimating the user profitability based on the financial information; and
  - a user interface for negotiating fees to be charged to the user based upon estimating profitability and the desired level of service prior to providing services at the service level;
- a coach computer system coupled to said wide area network;
- a financial advisor service system, coupled to said wide area network, wherein the financial advisor service system offers to the user the plurality of unique service levels, each including a unique combination of available computer counseling and live counseling, the live counseling being performed by a financial advisor, and wherein the financial advisor service system develops a service level of financial counseling services for the user;
- a financial needs generator which operates according to the financial information of the user and services provided by the service level, including processing the user's intended financial state, analyzing the user's investment portfolio, calculating the user's future income and expenses, assets, and liabilities, and factoring in risk events;
- a financial analysis generator which provides the financial advisor with the financial information and analysis of the financial needs of the user, detailing areas that require attention;
- a financial model generator including a computer counselor subsystem and a live counselor subsystem that interacts with the coach computer system, where the computer counselor subsystem and the live counselor subsystem both permit a dialogue with the user over the Internet, where the amount of available usage of both the computer counselor subsystem and the live counselor system is determined by the user's service level agreement, and the user can initiate communication with the financial advisor to obtain live counseling during the computer counseling.

9. A financial advisor system as in claim 8 wherein said wide area network is the internet.

10. The system of claim 8 wherein the service level agreement includes a determination of access to at least one account of a user.

11. The system of claim 8 wherein the financial model generator includes:
- a subsystem for developing a user's equity investment portfolio.

12. The financial model generator of claim 11 further comprising:
- an engine for determining the user's financial goals and the user's risk tolerance;
- an engine for determining the current equity position of the user;
- a user interface for suggesting new equity positions for the user.

13. The user computer system of claim 8, including an algorithm to direct the user to use computer coaching prior to using live coaching, if the service level is below a threshold.

14. The coach computer system of claim 8 wherein the system includes:
- a user interface for computer coaching to dispense general financial advice based on the user's financial model.

15. The live counselor system of claim 8, further comprising:
- a user interface for live coaching to dispense specific financial advice based on the user's financial model.

16. A computer program embodied on a computer readable medium for providing a web-based, online personalized financial counseling over the Internet in a collaborative computing environment, wherein the computer program comprises executable code for:
- developing a service level agreement with a user which includes a desired service level of financial counseling services for the user, including:
  - providing a plurality of unique service levels each including a unique combination of available computer coaching and live coaching, the live coaching being performed by a financial advisor;
  - prompting a user to input personal financial information;
  - receiving the user desired level of financial management service from the plurality of available unique service levels;
  - estimating profitability based on the financial information; and
  - negotiating fees to be charged to the user based upon estimating profitability and the desired level of service prior to providing services under the service agreement;
- analyzing, with the services provided by the service level, the financial needs of the user according to the financial information of the user, including processing the user's intended financial state, analyzing the user's investment portfolio, calculating the user's future income and expenses, assets, and liabilities, and factoring in risk events;
- providing the financial advisor performing live coaching with the personal financial information and analysis of the financial needs of the user, detailing areas that require attention;

developing a financial model for the user to address the financial needs of the user by utilizing the computer coaching and the live coaching, including permitting the user to enter a dialogue with at least one of a computer-generated coach and the financial advisor over the Internet as determined by the service level agreement, and permitting the user to initiate communication with the financial advisor to obtain live coaching during the computer coaching dialogue; and generating a financial model for the user to implement computer coaching and live coaching as determined by the service level agreement.

17. The computer program of claim 16, further comprising determining access at least one to a account of a user.

18. The computer program of claim 16 for developing a financial model, further comprising:

developing the user's equity investment portfolio.

19. The computer program of claim 18, further comprising:

determining the financial goals of the user and the user's risk tolerance;

determining the current equity positions of a user;

suggesting new equity positions for the user.

20. The computer program of claim 16, further comprising:

restricting a user to use computer coaching before accessing live coaching.

21. The computer program of claim 20 wherein the automated coaching further comprises:

computer coaching to dispense general financial advice based on the user's financial model.

22. The computer program of claim 20 wherein the live coaching further comprises:

computer coaching to dispense specific financial advice based on the user's financial model.

* * * * *